(12) United States Patent
Holmes et al.

(10) Patent No.: US 12,384,189 B2
(45) Date of Patent: Aug. 12, 2025

(54) METHOD OF FORMING A SECURITY DEVICE

(71) Applicant: DLR NEWCO LIMITED, Basingstoke (GB)

(72) Inventors: Brian Holmes, Fleet (GB); Michael Fickes, Basingstoke (GB); Michael Levin, Basingstoke (GB)

(73) Assignee: DLR Newco Limited, Basingstoke (GB)

( * ) Notice: Subject to any disclaimer, the term of this patent is extended or adjusted under 35 U.S.C. 154(b) by 766 days.

(21) Appl. No.: 17/628,790

(22) PCT Filed: Jul. 27, 2020

(86) PCT No.: PCT/GB2020/051805
§ 371 (c)(1),
(2) Date: Jan. 20, 2022

(87) PCT Pub. No.: WO2021/038187
PCT Pub. Date: Mar. 4, 2021

(65) Prior Publication Data
US 2022/0355608 A1    Nov. 10, 2022

(30) Foreign Application Priority Data
Aug. 23, 2019 (GB) .................. 1912156

(51) Int. Cl.
*B42D 25/328*     (2014.01)
*B42D 25/23*      (2014.01)
*B42D 25/29*      (2014.01)

(52) U.S. Cl.
CPC .......... *B42D 25/328* (2014.10); *B42D 25/23* (2014.10); *B42D 25/29* (2014.10)

(58) Field of Classification Search
CPC ....... B42D 25/238; B42D 25/23; B42D 25/29
(Continued)

(56) References Cited

U.S. PATENT DOCUMENTS 3,658,526 A    4/1972  Haugh
4,621,040 A    11/1986 Viola
(Continued)

FOREIGN PATENT DOCUMENTS

EP    0828203 A2    3/1998
EP    0 407 771 B1   9/1998
(Continued)

OTHER PUBLICATIONS

Sep. 29, 2020 International Search Report issued in International Patent Application No. PCT/GB2020/051805.
(Continued)

*Primary Examiner* — Sharrief I Broome

(57) ABSTRACT

A method of forming a security device includes: a holographic image layer, diffusion element, and barrier layer. A region of the barrier layer includes a heat-transformable material. The method further includes selectively applying heat at a plurality of positions within the region of the barrier layer, in accordance with a predetermined pattern, so as to modify the heat-transformable material such that the region of the barrier layer is selectively rendered passable to the diffusible substance at each of the plurality of positions, thereby permitting diffusion of the diffusible substance between the regions of the diffusion element and the holographic image layer such that, at a plurality of positions within the region of the holographic image layer and corresponding to the predetermined pattern, the volume hologram is dimensionally modified so as to become viewable in a second observable colour, different from the first observable colour.

20 Claims, 5 Drawing Sheets

(58) Field of Classification Search
USPC .............................................................. 359/2
See application file for complete search history.

(56) References Cited

U.S. PATENT DOCUMENTS

| | | | | |
|---|---|---|---|---|
| 4,959,283 A | * | 9/1990 | Smothers ................ | G03F 7/027 |
| | | | | 430/1 |
| 5,182,180 A | * | 1/1993 | Gambogi, Jr. ........... | G03H 1/24 |
| | | | | 430/1 |
| 5,725,970 A | * | 3/1998 | Martin .................... | G03F 7/001 |
| | | | | 430/1 |
| 2010/0254015 A1 | * | 10/2010 | Booyens ................ | G02B 30/27 |
| | | | | 359/619 |
| 2011/0049864 A1 | * | 3/2011 | Menz ....................... | G03H 1/18 |
| | | | | 156/242 |

FOREIGN PATENT DOCUMENTS

| | | | |
|---|---|---|---|
| WO | 2014/114582 A2 | 7/2014 | |
| WO | 2018/215794 A2 | 11/2018 | |

OTHER PUBLICATIONS

Sep. 29, 2020 Written Opinion issued in International Patent Application No. PCT/GB2020/051805.

* cited by examiner

Fig. 3
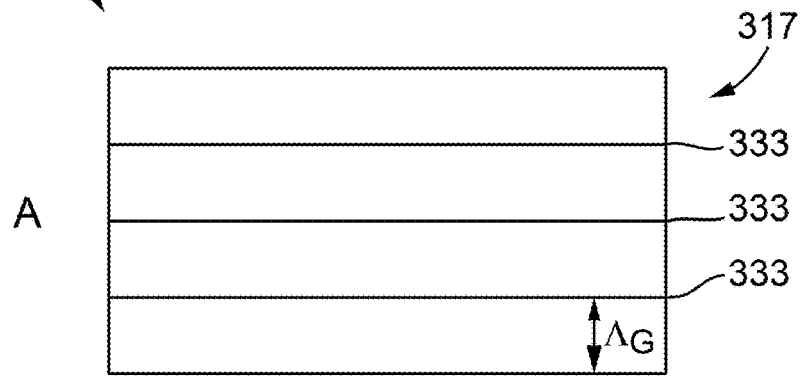
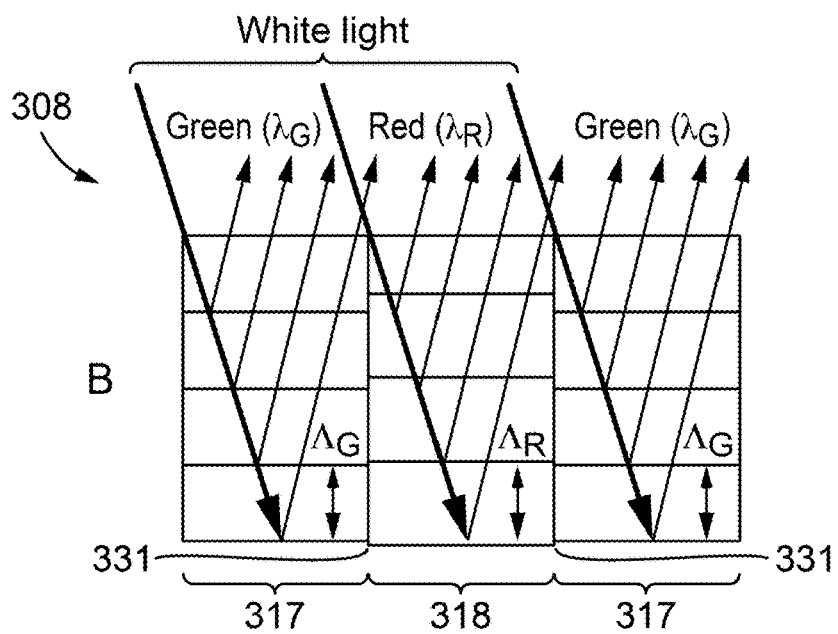
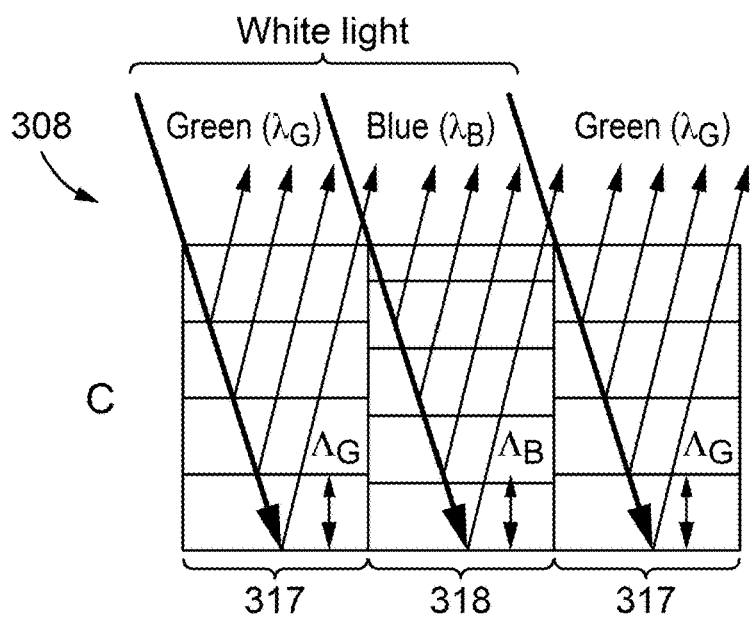

METHOD OF FORMING A SECURITY DEVICE

FIELD OF THE INVENTION

The present invention relates to a method of forming a security device. In particular this invention relates to forming security devices by way of selectively applying heat at a plurality of positions within a region of a barrier layer that is otherwise impassable to a diffusible substance, thereby permitting diffusion between regions of a diffusion element and a holographic image layer such that a volume hologram comprised by the holographic image layer region is dimensionally modified at positions corresponding to a predetermined pattern and thereby cause a change in the observable colour. Security devices are used for example on security articles or documents of value such as identity cards, passports, and other secure documents, in order to confirm their authenticity. Security articles and security devices comprising the security device, and method of forming them, are also disclosed.

DESCRIPTION OF THE RELATED ART

To prevent counterfeiting and enable authenticity to be checked, security documents are typically provided with one or more security devices which are difficult or impossible to replicate accurately with commonly available means, particularly photocopiers, scanners, and commercial printers.

Articles of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. By "security device" we mean a feature which it is not possible to reproduce accurately by taking a visible light copy, e.g. through the use of standardly available photocopying or scanning equipment. Examples include features based on one or more patterns such as microtext, fine line patterns, latent images, venetian blind devices, lenticular devices, moiré interference devices and moiré magnification devices, each of which generates a secure visual effect. Other known security devices include watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security devices are holographic devices, in which a hologram comprised by the device exhibits a striking visual effect. Such holographic security devices are well known in the art, as described, for example, in WO 2018/215794 A2.

Various different forms of hologram are available for use in security devices, and these conventionally include holograms comprising a surface relief where the diffraction of incident light from the surface relief generates a holographic effect. An alternative form of hologram that has been found to be suitable for use in security devices is a volume hologram. These holograms, which are also known as "Lippmann" holograms, are another class of holograms that are viewable under normal, white light illumination conditions. With volume holograms, a holographic image is generated by Bragg reflection from a series of refractive index-modulated fringes forming a diffraction pattern within the volume of a material. Volume holograms are both wavelength- and angularly selective with regard to the incident light with which they are illuminated, and so advantageously do not show mixing of parallax views in the holographic image to the same degree as embossed, surface relief holograms.

Techniques for manufacturing volume holograms are well known, and are described, for example, in U.S. Pat. No. 3,658,526. Further developments in the manufacture of volume holograms have in part focussed upon using polymer materials, and in particular photopolymer materials, as suitable holographic recording mediums in which diffraction patterns for reconstructing holographic images can be encoded. Examples of suitable materials and production techniques in relation to this are disclosed for instance in EP 0407771 B1.

In many security articles and documents of value, of various classes, the security level and authenticating or identifying information that may be carried by the document or article is enhanced by combining visual information, such as personalised information relating to an identity card for example, with security devices that give rise to memorable and secure visual effects. Conventionally, this combination involves printing or overlaying visual information in a different layer to, usually on top of, and typically overlapping, security devices such as those that produce an optically variable effect.

An example of a known technique for personalising a security element in this way is described in WO 2014/114582 A2. That disclosed method involves printing a holographic layer with an ink and fixing the holographic layer to produce the hologram in the holographic layer, wherein the produced printed device and the hologram are arranged in the holographic layer such that the printed device and the hologram overlap.

Personalisation processes such as these are typically performed with conventional printing techniques, and therefore do not in themselves significantly enhance the security level of the security article or document beyond that provided respectively by the presence of a holographic element and a printed element.

As counterfeiting technology inevitably improves, there is an increased need to provide holographic security devices having increased security, and in particular incorporating visual data or personalised information in the manner that in itself renders the appearance of the device or article more visually striking and more difficult to replicate using readily available counterfeiting technology.

Volume holograms, as is well known in the art, are optically active in specific, typically narrow, wavelength ranges that are dependent upon the recording parameters used to produce the hologram. It has been recognised in the art that, because volume holograms are therefore viewable in light having approximately the same wavelength as that used to record the hologram, it is beneficial in many applications to be able to modify the replay wavelength of the hologram to a particular desired colour, by applying a colour tuning process that can shift the active waveband of the hologram away from its original colour, especially since the unmodified colour of a hologram conventionally is dictated by the wavelength of the recording source, which is typically a laser, used to produce the hologram. To effect these colour changes, colour-tuning films have been used to alter the replay colour of holograms, as disclosed, for example, in U.S. Pat. No. 4,959,283. Techniques such as those described therein involve the use of a diffusion element that may be contacted to a volume hologram across a major surface thereof so as to effect a dimensional shift, and consequently a colour change in the replay wavelength across the volume hologram, by way of causing diffusion of a diffusible substance, such as a monomer or a liquid solvent, between the volume hologram and the diffusion element.

A process for selectively colour-shifting a volume hologram in order to form a multicolour hologram is described in U.S. Pat. No. 5,182,180. The process involves imagewise exposure of a diffusing element to actinic radiation so as to polymerize partially a monomer therein, and contacting the element to a film comprising a volume hologram such that the wavelength of light response by the hologram is selectively modified by the diffusion of monomer from said diffusion element occurring in a pattern defined by the imagewise partial polymerization While this approach allows a multicolor hologram to be formed, it is restrictive in terms of the manufacturing process. In particular, the imagewise patterning by way of selective radiation exposure applied to the monomer-containing element must be performed either prior to the element coming into contact with the hologram film or while it is in direct contact with the hologram film. Moreover a multi-layer assembly comprising a hologram film in contact with a diffusion element as employed in that process would be unstable, in that unwanted and uncontrolled diffusion of the monomer would spontaneously occur. Such assemblies would therefore suffer from undesired colour shifting.

There exists a need for a solution to the problem described above of personalising volume holograms with enhanced security, colour stability, and ease and flexibility of manufacture. The inventors have found, surprisingly, that colour tuning methods and substances such as those described in the above-referenced document, may be used to provide such a solution.

SUMMARY OF THE INVENTION

In accordance with a first aspect of the present invention there is provided a method of forming a security device, the method comprising: providing a multilayer assembly comprising: a holographic image layer having a region comprising a volume hologram that is viewable in a first observable colour, the region being formed from a material comprising a diffusible substance at a first concentration; a diffusion element having a region that overlaps the said region of the holographic image layer and is formed from a material comprising the diffusible substance at a second concentration, different from the first concentration; and a barrier layer having a region that is impassable to the diffusible substance and is interposed between the said region of the holographic image layer and the said region of the diffusion element so as to preclude diffusion of the diffusible material therebetween, the said region of the barrier layer comprising a heat-transformable material, and selectively applying heat at a plurality of positions within the said region of the barrier layer, in accordance with a predetermined pattern, so as to modify the heat-transformable material such that the region of the barrier layer is selectively rendered passable to the diffusible substance at each of the plurality of positions, thereby permitting diffusion of the diffusible substance between the said regions of the diffusion element and the holographic image layer such that, at a plurality of positions within the said region of the holographic image layer and corresponding to the predetermined pattern, the volume hologram is dimensionally modified so as to become viewable in a second observable colour, different from the first observable colour.

In seeking to improve upon conventional methods for marking security devices with visible information as discussed above, the inventors have realised that, with the use of a heat-transformable barrier layer to control highly localised changes in the observable colour of a volume hologram, it is possible to produce security devices that exhibit a striking visual effect and are difficult to counterfeit by virtue of comprising a volume hologram and carrying personalised information or any other desired markings within the visible reconstructed holographic image, exhibited by the volume hologram itself.

Moreover, the method facilitates the production of localised changes, in any desired pattern, to the colour of a provided, pre-recorded volume hologram. Providing the assembly with the holographic image layer and diffusion element being separated by a barrier layer, in combination with selectively heating the barrier layer, to effect the production of a changed observable colour according to a predetermined pattern provides the benefit that holographic security devices may be patterned simply by applying heat to the provided assembly, according to the desired pattern. Thus the hologram patterning process and the equipment required, namely a heat source capable of localised or patterned heating, such as a laser device or other directed radiation source, are relatively simple compared with prior art approaches to both hologram personalisation and hologram colour tuning, which typically involve large and complex apparatus and more complicated and costly processes. The method thus advantageously facilitates the personalisation or marking of a holographic security device being performed separately from the manufacturing of the security device and, importantly, a simple, rapid, low-cost process that relies primarily upon pattern-wise heating, rather than any convoluted printing mechanisms or post-patterning assembly steps. This means, for example, that personalisation may be carried out after the security device has been assembled, and may be carried out at smaller, decentralized sites with limited manufacturing means, such as security document issuance offices for instance, with the markings still becoming an integral part of the hologram in the final security device. In this way the method overcomes the restrictive manufacturing requirements of existing approaches to personalisation and colouring of volume holograms. In particular, the method is conducive to pre-assembling a multilayer structure containing a volume hologram, and patterning it at any time afterwards, which is not possible when patterning is performed by way of imagewise partial polymerization according to prior art techniques, for example. The solution provided by the method according to this disclosure results in a stable multilayer assembly that can be patterned at any time after assembly, and therefore may be personalized more readily at decentralized facilities.

The provision of visual data that is integrated into a volume hologram without any destruction, degradation, or obscuring of the holographic visual effect by the markings themselves further enhances the security level of the device, and provides a memorable visual effect that is easy to authenticate and more difficult to counterfeit, compared with an equivalent device with personalisation or other visible information marked on to a hologram layer by conventional printing techniques, for example. Additionally, the aforementioned capacity for personalising volume hologram elements of security documents containing the security device or security article after it has been produced permits advantageous flexibility in the overall production process without compromising the security level of the finished device. For security documents such as passports, for instance, the assembly process of the document is typically carried out at a centralised manufacturing facility, while it is desirable for the documents to be personalised in a decentralized manner, such as at regional or local authorities.

In the provided multilayer assembly, the aforementioned components, namely the holographic image layer, the barrier layer, and the diffusion element, are all typically attached together to form the assembly. Producing the assembly may involve, for example, bonding the layers together, or using a lamination process for instance. The multilayer assembly optionally further comprises one or more adhesive elements or layers applied so as to bond one component of the assembly to another.

The volume hologram is typically recorded in the region of the holographic image layer prior to the provision of the assembly. The volume hologram may, in some embodiments, extend beyond or outside of the said region of the holographic image layer. In some embodiments the volume hologram comprises, or depicts, a holographic image. This may be thought of as a visual impression or representation of some form, typically a three-dimensional (3D) image having been recorded in the holographic image layer region. In this disclosure, the holographic image layer refers to the physical layer, or medium, in which the volume hologram has been recorded, whereas the volume hologram may be thought of as the interference pattern recorded in that medium, which, when suitably illuminated, produces an observable holographic, preferably three-dimensional, image. The volume hologram being viewable refers to the holographic optical effect exhibited by the holographic image layer being able to be seen or inspected, rather than simply to the holographic image layer itself being visible in absence of any holographic effect, which may be the case, for example, where illumination conditions are insufficient, or the angle of view of an observer is outside of those in which the volume hologram may be seen.

In some embodiments, the holographic image layer comprises a Holographic Optical Element (HOE). This may take the form of a reflection mirror, lens or directional diffuser, for example. An HOE comprising a colour-shifted pattern produced according to the method advantageously provides a particularly striking visual effect.

It is possible in some embodiments for the holographic image layer to comprise both a holographic image as described above and an HOE.

It will be understood that, typically, a volume hologram viewed in, or more specifically viewed when illuminated with, white light, or light comprising a combination of radiation of different wavelengths in the electromagnetic spectrum, passes, or reflects so as to permit viewing, a wavelength identical to or corresponding to the wavelength of the radiation that was used to record the volume hologram. Typically, in practice the colour in which a volume hologram is visible is not truly monochromatic, and is produced by a narrow range of wavelengths, albeit with a non-zero line width, centred round a particular wavelength. Therefore, a volume hologram can typically be seen only in the colour corresponding to that recording wavelength, or the narrow band comprising it. In the context of this disclosure, an observable colour is, due to the narrow range of wavelengths that produce it, typically a chromatic colour. This may be thought of as a colour in which one particular wavelength or hue predominates. Examples of such chromatic colours are red, green, and blue, as opposed to white, black, and grey, which would be understood as being achromatic. Preferably, the observable colour is monochromatic, or is substantially monochromatic taking into consideration the aforementioned non-zero line width. The wavelength, or the range of wavelengths, in which the hologram is viewable may be thought of as the replay wavelength or wavelengths of the hologram. Typically, an observable colour is a colour within the visible band of the electromagnetic spectrum, that is within a wavelength range of approximately 400-700 nm.

The first observable colour, at least, is typically governed by the wavelength of the laser that was used to record the volume hologram. For instance, the first observable colour typically is the same as the colour of the recording laser. It is possible, however, in some embodiments, for the entire provided holographic image layer region to have already been uniformly colour-shifted away from the original recording colour. This may have been performed by the said region having been contacted with a diffusion element to cause shrinkage or swelling in the layer, and a resulting colour shift, prior to the multilayer assembly being provided.

It will be understood that it is by way of selectively shifting the replay wavelength of the volume hologram at predetermined locations that a pattern can be produced in the hologram. It will therefore also be understood that, preferably, the first, unmodified replay colour, that is the first observable colour, is as different as possible from the second replay colour, that is the second observable colour. Increasing this colour difference produces an increased colour contrast, or difference in observable colour, between the modified and unmodified portions of the volume hologram, so as to render the produced pattern easily discernible and visually striking to a viewing user.

Although it is preferable that the first and second observable colours correspond to distinct, non-overlapping lines or bands of wavelengths in the electromagnetic spectrum, it is possible in some embodiments for the first and second observable colours to correspond respectively to first and second replay wavelength ranges that may overlap one another. In such cases, the required difference between the first and second observable colours may still arise by virtue of the first and second ranges being different, in that they may have any of: different median wavelengths, different maximum wavelengths, different minimum wavelengths, and different peak wavelengths, the peak wavelength being the wavelength in the range that is most strongly or efficiently reflected by the volume hologram. By way of the first and second colour ranges different from one another in any of these respects, the overall composition of the light in which the volume hologram is viewable is caused to be different between the modified and unmodified portions.

The colour difference between the first and second observable colours may, in some embodiments, be defined as the difference between the median wavelength, the mean wavelength, or the peak wavelength, in a range of wavelengths in which the volume hologram is viewable for a given part of or a given position on the holographic image layer. Typically, the colour difference is at least 30 nm, preferably at least 50 nm, or preferably at least 100 nm, and more preferably still at least 150 nm.

As will be discussed later in this disclosure in further detail, the diffusible substance may be selected from a number of different substances. The term "diffusible" in this context typically defines the substance as being able to be transported and/or intermingle within the materials of the holographic image layer and the diffusion element by diffusion. Thus, any substance may typically be selected that is able to be diffused within those aforementioned materials.

The region of the barrier layer being impassable typically means that that region does not allow the diffusible substance to pass through it. Typically, the barrier layer region is impermeable, and prevents passage therethrough of all species, molecules etc. In some embodiments, the region of the barrier layer as provided may be semipermeable, that is permeable for some substances and not for the diffusible substance. The term "impassable" typically means that the barrier layer region is impassable to the diffusible substance at least when the barrier layer is under the conditions in which the multilayer assembly is provided when performing the method. For example, in embodiments where the method is carried out with the multilayer assembly being provided under normal temperature and pressure conditions, for example 20° C. and 1 standard atmosphere, that is 101,325 Pa, the permeability of the barrier layer region, at least to the diffusible substance, is typically zero, that is impassable, or is substantially so.

The barrier layer being interposed between the regions of the holographic image layer and the diffusion element typically involves the barrier layer region contacting, either directly or indirectly, one or both of the holographic image layer and diffusion element regions. Indirect contact may typically be by way of an adhesive between the barrier layer and either or both of the holographic image layer and diffusion element. The adhesive may be provided, for example, in the form of a layer between the barrier layer and the respective surface of the holographic image layer or a diffusion element. The adhesive may be a continuous layer, or may be provided in discontinuous portions of adhesive. The positioning of the barrier layer region with respect to the said regions of the holographic image layer and diffusion element is typically such that the barrier layer region is interposed between the holographic image layer region and the diffusion element region so as to fully overlap and thereby preclude diffusion across, a region defined by the extent of the overlap between the region of the holographic image layer and the region of the diffusion element. The regions of the holographic image layer and diffusion element may be registered with one another, and in such cases the region of the barrier layer may be in register with those two regions also. In embodiments wherein the region of the holographic image layer and the region of the diffusion element are only partially overlapping, then the barrier layer region typically extends at least across the entirety of the region of that partial overlap. Any number of different arrangements are possible, such as a simplified embodiment wherein each region extends across substantially the whole of its respective layer. In most embodiments, it is preferable for the barrier layer region to be interposed so as to prevent any diffusion between the holographic image layer and the diffusion element before the selective application of heat to the aforementioned positions in the barrier layer region.

Diffusion between the holographic image layer region and diffusion element region is typically precluded solely by the presence of the barrier layer prior to the selective application of heat to the barrier layer, or at least when the multilayer assembly is provided. This typically means that diffusion would occur between the holographic image layer and the diffusion element in the absence of the barrier layer region, typically owing to the proximity between the diffusion element and the holographic image layer regions, whereby a concentration gradient of the diffusible substance exists between those two regions because of the difference between the first and second concentrations of the diffusible substance. Therefore, the region of the barrier layer is typically positioned with respect to both the region of the holographic image layer and the region of the diffusion element so as to block any diffusion of the diffusible substance between the holographic image layer and diffusion element regions. This is typically achieved by providing the barrier layer region as a continuous portion of material that is impassable to the diffusible substance across the entire interface, or substantially all of the interface, between the holographic image layer and diffusion element regions.

For each of the holographic image layer, the barrier layer, and the diffusion element, the respective said region thereof may be any arbitrary defined portion of the respective layer or element. A part, or parts, of each respective layer other than the said region may be formed of the same material, or similar material, as the region and/or may have identical or similar physical properties. For example, the holographic image layer may have a volume hologram recorded in a portion thereof that is greater in size than, or overlaps with, or completely contains, the said region of the holographic image layer. Similarly, the barrier layer may form an impassable (at least to the diffusible substance) barrier across at least a region of overlap, or interface, between the regions of the holographic image layer and diffusion element. This typically means that the barrier layer region, or any impassable (to the diffusible substance) part of the barrier layer may correspond to, and is preferably in register with, that region of overlap, or it may extend beyond it.

The said region of any of the holographic image layer, diffusion element, and barrier layer may be a region having constituent materials, thickness, or other physical properties that differ from those of other parts of the respective layer or element. For example, a region may be formed as a subregion of the region defined by the layer or element as a whole, or at least a larger region thereof. Such embodiments may be preferred if it is desired to form the volume hologram as a window within the film or substrate defined by the multilayer assembly or at least the holographic image layer, for example.

The aforementioned interface between the holographic image layer and diffusion element regions is typically one of indirect contact between those two regions, at least prior to the transformation of the barrier layer region by the application of heat.

The application of heat to the said positions in the barrier layer region is typically performed such that the region of the barrier layer is selectively rendered passable to the diffusible substance by way of forming a passable portion (passable at least to the diffusible substance) at each of the plurality of positions.

A passable portion may be formed, for example, by the creation of one or more voids, gaps, perforations, or discontinuities in the barrier layer material through which the diffusible substance may pass between the holographic image layer and diffusion element regions. Preferably, the barrier layer region is sufficiently thin and/or the material of one or both of the diffusion element and holographic image layer regions at the interface with the barrier layer region is sufficiently formable, plastic, or fluid for a diffusion path to be created at each perforation or gap created by the heat-transformation. For instance, the chosen materials in the multilayer assembly and/or the heating parameters with which the heat is applied to the barrier layer region may be chosen such that the holographic image layer and the diffusion element are caused to come into contact with one another at each of the plurality of positions in the barrier layer region by the creation of a gap or other form of passable portion. In some embodiments, the barrier layer may be rendered permeable, or semipermeable, by the heat-transformation so as to allow the diffusible substance to permeate through it at the heated position. Additionally, or alternatively, the heat-transformation may comprise melting the barrier layer at each of the plurality of positions therein such that the diffusible substance, or specifically molecules thereof, may be transported or otherwise passed through a molten or melted part of the barrier layer from one side to the other. In addition to liquefying parts of the barrier layer, some envisaged embodiments may involve causing sublimation of the barrier layer material at the heated location. The particular phase change, or more generally the particular physical response of the barrier layer to the localised heating, will depend upon the material selected to form the barrier layer.

Thus the transformation of the barrier layer material may be configured to render the barrier at a heated position selectively passable, for example a gap or perforation that allows all species to pass therethrough. Alternatively, the transformation may otherwise cause the barrier layer material to act as a selectively passable, or semipermeable, barrier, that is passable at least to the diffusible substance, for example by being thinned or rendered porous, or otherwise turned fluid so as to permit the diffusible substance to be transported through it.

The permitting of diffusion of the diffusible substance between said regions may also be thought of as causing the said diffusion to take place by way of selectively rendering passable to the diffusible substance parts of the barrier that, in its unmodified form, precludes diffusion. Therefore, the multilayer assembly, and in particular the first and second concentrations of the diffusible substance in the assembly as provided, and the proximity between the diffusion element and holographic image layer regions, which may be thought of as being governed primarily by the thickness of the barrier layer region, are typically configured such that diffusion will occur between the holographic image layer and diffusion element regions upon the barrier layer material therebetween being rendered passable to the diffusible substance.

The selective application of heat may be thought of as applying a patterned heat process to the barrier layer so as to cause the multilayer assembly, specifically and most importantly the holographic image layer, to undergo a patterned diffusion process. It is the non-uniform, patterned swelling or shrinking of the holographic image layer that results from this patterned diffusion which results in the colour-patterning of the volume hologram.

The dimensionally modifying the volume hologram refers generally to the modifying of the dimensions of its physical structure, that is the pattern of modulated refractive index in the holographic image layer material that diffracts light into a reconstructed holographic image. Specifically, this modification typically involves either increasing or decreasing the scale of the recorded diffraction pattern, and it is by causing this increase or decrease to occur in a pattern-wise manner on the holographic image layer that the marking or personalisation pattern is produced. Typically, therefore, for selected parts of the hologram, according to the predetermined pattern, a change is caused to the wavelength in which the volume hologram is visible. For example, localised swelling of the holographic image layer would cause a localised increase in interference fringe spacing, and so would increase the replay wavelength of the hologram at that position, for instance so as to cause a shift in appearance towards the red end of the visible spectrum. Likewise, a decrease in the dimensions of the pattern, would mean a decrease in the interference fringe spacing and consequently a shift in appearance towards the violet end of the visible spectrum.

The dimensional modification of the volume hologram pattern may be non-uniform across the thickness of the holographic image layer in some embodiments. In volume holograms, the interference pattern is typically encoded throughout the thickness or depth of the holographic image layer. The localised swelling or shrinking of the holographic image layer material by the diffusion of an amount of diffusible substance into or out of the holographic image layer region typically does not occur uniformly throughout the entire thickness of the holographic image layer.

The terms "depth" and "thickness" in this context refer to the distance between the two major surfaces of the holographic image layer, and to the axis or direction that is normal to the major surfaces. This is typically a result of the diffusion of the diffusible substance in or out of the holographic image layer occurring at an interface with the diffusion element (through the passable, heat-modified part of the barrier layer region), which typically causes the dimensional modification to be strongest at parts of the holographic image layer that are closest to that interface (and closest to the passable part of the barrier layer region through which the modification-causing diffusion occurs).

As a consequence of the degree of dimensional modification varying throughout the thickness of the holographic image layer at a given patterned or modified position thereon, the resultant shift in the replay wavelength may typically be a widening of the replay wavelength band. In such cases, the second observable colour is defined by this widened wavelength band. In such embodiments, the dimensional modification and the resulting change to the wavelength band defining the second observable colour, which includes, but may not be limited to, widening that wavelength band, still causes a visible shift in the colour, so that the second observable colour is visibly distinguishable from the first observable colour. For example, if the volume hologram as provided in the multilayer assembly is viewable in a green colour, and if the selective diffusion process results in localised swelling of the holographic image layer that occurs to a greater degree toward the major surface of the holographic image layer proximal to the diffusion element, the replay wavelength range is typically widened at the modified portions such that the volume hologram is visible at those portions in a second observable colour that comprises a mix or combination of constituent colours that corresponds to the wavelengths of the widened band.

In this example, the second observable colour may comprise a range of colours, and the visible colour at the modified portions may include redshifted components, as well as components that are only minimally shifted, or not shifted at all, from the original green colour. The presence of the redshifted wavelengths in the parts of the reconstructed image corresponding to the modified portions of the holographic image layer results in the second observable colour being visibly different from the first observable colour, which contains no such redshifted components.

Preferably, the second observable colour corresponds to a wavelength that is reflected by dimensionally modified holographic image layer region portions. Preferably, the wavelength is shortened or lengthened relative to the unmodified portion visible colour. The second observable colour may be a colour corresponding to a band of radiation wavelengths, as noted above, and this band may include wavelengths corresponding to the modified holographic image layer wavelength, or the modified interference pattern spacing that gives rise to the changed wavelength. The second observable colour may also include wavelengths between such a wavelength and a wavelength or wavelengths corresponding to the unmodified portion visible colour.

In this way, as alluded to above, a portion of the volume hologram to be patterned, that is have its colour changed, might not in some embodiments be modified uniformly throughout the entire thickness of the holographic image layer, but may be modified in particular, or more strongly, at depths closer to the diffusion element than at depths distal to it. It will be understood, therefore, that the second observable colour can in some embodiments include a contribution from the first observable colour, for example if some part of the recorded volume hologram pattern remains unmodified at a portion above, a dimensionally modified portion. Thus the second observable colour may include this contribution, and/or other colours that are intermediate between the first observable colour and the wavelength or colour that corresponds to the maximum dimensional modification performed at a given location on the holographic image layer.

Although the applying of heat to the positions of the barrier layer may be performed in principle with any means for localised heating, it is preferable, particularly for implementations wherein a preassembled security device or article is to be patterned by the method, for the heating to be performed using radiation. For such applications, the barrier layer preferably comprises a radiation-absorbing material, that is a material or substance that is opaque to, that is absorbative to, electromagnetic radiation. Preferably, the barrier layer material is completely opaque, or substantially so, to the radiation being applied for heating purposes, since this facilitates greater heating efficiency and responsiveness to heating. It is possible, however, for the barrier layer region material to be only partly opaque to the particular radiation being applied for heating. Typically, the degree of absorption in the region of the barrier layer is greater than 50%. Preferably, the degree of absorption is greater than 70%, more preferably greater than 80% and more preferably still greater than or 90% for the radiation being applied. More generally, the degree of absorption is typically in a range at which the absorption of the applied radiation is sufficient to permit a degree of heating of the barrier layer region at the locations that is adequate to transform it, for radiation of a given intensity, duration of heating, and/or dwell time.

Preferably, therefore, the region of the barrier layer is formed from a material that absorbs electromagnetic radiation in at least a range of wavelengths. This allows the barrier to be locally heated, so as to be selectively transformed, or rendered passable to the diffusible substance, in response to locally applied radiation having a wavelength in a first range, which may be thought of as a heating range. In some embodiments wherein viewing in transmitted light without having to remove the barrier layer is desired, the barrier layer is preferably transparent, that is non-absorbing, or transmissive, to electromagnetic radiation with wavelengths corresponding to the first and second observable colour. Preferably, the barrier layer region is transparent to radiation having a wavelength in a second range, which may be thought of as a viewing range of wavelengths.

The radiation absorbing material may be the same as the heat-transformable material. For example, the barrier layer may be formed from, or include as a component, a material that is both heat-transformable, in the sense that it can be modified by applied heat, and radiation-absorbing, in the sense that it is absorptive, that is has a tendency or capability to absorb radiation, in at least a specific range or ranges of wavelengths. More preferably, the barrier layer region is formed from a heat-transformable material that is doped with, or otherwise comprises as a component, a different substance as the radiation absorbing material, such as a pigment or a dye, that absorbs radiation in particular wavelength band or bands. Typically, therefore, the barrier layer region material, and therefore the barrier layer region itself, is transformable in response to incident radiation.

In such embodiments, the said selectively applying heat preferably comprises exposing the barrier layer, at the said plurality of positions within the said region thereof, to radiation, in particular radiation to which the said radiation-absorbing material is opaque or absorptive. In this way, the method may comprise irradiating the barrier layer region in accordance with the predetermined pattern. Applying the heat by way of causing a beam of radiation, such as infrared radiation, to impinge upon the plurality of positions facilitates pattern-wise heating of the barrier layer region without directly heating, or heating only minimally so as to avoid any unwanted heating effects or damage, the diffusion element and the holographic image layer that are disposed either side of the barrier layer. The heating may be performed using a radiation source to apply the heat, for example by generating a directable beam of radiation that can be configured to irradiate a pattern of positions on the barrier layer region, preferably by directing the beam through either of the holographic image layer region and diffusion element region, which are preferably transparent or substantially transparent to a radiation in the wavelength range of the beam.

It has been found that infrared radiation is particularly suitable for heating the barrier layer positions. Preferably, therefore, the said radiation-absorbing material is opaque at least to radiation having a wavelength within a range in the infrared region, which may be preferably infrared or near-infrared, of the electromagnetic spectrum. Thus typically the material of the barrier layer region is selected so that it includes, or is doped to include a substance that is opaque to, or absorbed, infrared radiation. This allows the barrier layer to be heated by irradiating it with infrared radiation.

A pattern of heat-transformed, passable positions in the barrier layer region may be created using a variety of different radiation-generating means. It is preferable, however, that the said exposing barrier layer to radiation comprises causing a laser beam to impinge upon the barrier layer at the said plurality of positions within the said region thereof. Accordingly, in such embodiments the radiation source is typically a laser device and the radiation beam is a laser beam. The laser device typically comprises a laser and a controller configured to direct the laser beam omitted by the laser in accordance with configured parameters. These parameters may include pattern parameters and/or heating parameters, defining the pattern in which the heat is to be applied and the degrees of heating to be applied during the process, respectively.

Lasers are particularly advantageous for the present method because they can be precisely targeted so as to define the transformed positions in the barrier layer region within an advantageous degree of precision, thus ensuring accurate patterning and high-precision heat transformations which lead to high-precision colour patterns in the volume hologram. Laser beams may also be beneficial to this method in that the area in which the beam impinges upon the barrier layer may be configured to be very small, for example a dot sufficiently small to produce heat-transformed positions on the scale of micrometres, preferably less than 100 µm across, more preferably less than 10 µm across, or more preferably still less than 5 µm across and even more preferably less than 1 µm across. This allows patterns to be formed comprising dimensionally transformed portions of the hologram with widths on a similarly small scale, and thus facilitates the production of high-resolution patterns that are visually striking and difficult to counterfeit.

Typically, the said heat-transformable material comprises, or is, a wax material, preferably, the wax material is a paraffin wax. Typically, the wax material has a melting point in the range 46-68° C. The degree of heating required to achieve melting of the barrier layer region at heated positions, starting from an assembly at 20° C., for example, is therefore achievable in a rapid manner, using a laser for instance.

Typically, the heat-transformable material, or the wax material in particular, is suitable for being formed as a coating on, or a layer in, the multilayer assembly. The melting points of typically waxes, for example paraffin wax, are sufficiently low that these materials can be transformed relatively easily by applied heat. The thermal properties of wax allow localised transformation, for example melting, at desired positions that may define the required pattern, while leaving unheated portions of the barrier layer region untransformed and impassable to the diffusible substance.

The method advantageously allows a security device to be formed by providing a pre-assembled multilayer assembly comprising a hologram and marking a pattern onto the provided device, specifically in the volume hologram thereof, by heating the barrier layer within the assembly. Providing the multilayer assembly preferably comprises obtaining the assembly already formed, therefore, that is it is preferable for the multilayer assembly to be formed in a separate process from the selective heating process by which the hologram is patterned. Nevertheless, in some embodiments the method comprises forming the multilayer assembly as part of the same process. In either case, forming the multilayer assembly may comprise; providing the holographic image layer, the said region of which comprises the volume hologram, that is with the volume hologram having already been recorded in the holographic image layer; applying a layer of an emulsion over at least a portion of the said region of the holographic image layer, the emulsion comprising the fluid containing a dispersion of particles that comprise the said heat-transformable material; and removing at least a portion of the fluid from the applied emulsion such that the particles remain so as to form the said region of the barrier layer. The emulsion layer may be applied, for example, by way of a roll coating process or preferably a gravure coating process. The layer may have the form of a film or a layer of fluid when it is applied. Thus a coating layer may be created over the region of the holographic image layer. The layer of emulsion may be applied directly or indirectly over the said portion of the holographic image layer region. Preferably, the emulsion layer is applied directly to the holographic image layer, so that the emulsion layer contacts the holographic image layer. Typically, however, the term "over" as used in this context does not necessarily imply any specific orientation of the assembly with respect to any particular reference frame during the method. Preferably, though, the holographic image layer is oriented, and the emulsion or coating is applied thereover, such that the emulsion coats a top surface of the holographic image layer that is the vertically uppermost surface. The emulsion layer is preferably applied over the entire region of the holographic image layer, and more preferably is applied over a portion of the holographic image layer that includes or encompasses the said region thereof.

The said dispersion of particles is preferably a plurality of particles dispersed within a fluid, specifically within a volume of fluid applied in the form of a film over the holographic image layer. Preferably, the emulsion is a wax emulsion, and more preferably is a paraffin wax emulsion. The term "wax emulsion" is used here to refer typically to a wax dispersion, since the wax is solid at room temperature, or normal temperature, such as that mentioned above. However, because the preparation of such an emulsion may typically take place at a temperature above the melting point of the wax, the process of preparing the dispersion may be called emulsification, and therefore the term "wax emulsion" is typically used. The removing of the fluid may be performed actively, for example by drying the surface of the holographic image layer. This may be performed, for example, by heating. It is also possible to allow the applied emulsion to dry without applying external heating, for example by allowing passive evaporation of the fluid. The fluid removal may comprise, preferably, removing substantially all of, or all of the fluid that is disposed on the holographic image layer, or the region thereof. Preferably, the fluid is removed uniformly, such that the region is dried evenly.

After the fluid has been removed, the said particles typically remain disposed or applied over the said region. If the emulsion is applied over only a portion of the holographic image layer region, the emulsion may in some embodiments have spread out, prior to the fluid being removed, so as to cover the entire region of the holographic image layer region in order to form an effective barrier across the entire region. The remaining particles may thus form the region of the barrier layer, or the barrier layer in its entirety.

Once the barrier layer has been formed, the diffusion element may be adhered to, or otherwise applied or laminated to, the barrier layer so as to form the multilayer assembly comprising the diffusion element, barrier layer, and holographic image layer. Preferably, therefore, providing the multilayer assembly further comprises applying the diffusion element over the barrier layer such that the said region of the barrier layer is interposed between the said region of the holographic image layer and the said region of the diffusion element.

A preferable way of applying the diffusion element to the barrier involves the use of a carrier layer or release layer. Typically in such embodiments, the diffusion element is applied by way of providing the diffusion element coated on a removable carrier film, which may be thought of as a release liner. For instance, a removable film such as a silicone-release polyethylene terephthalate (PET) film may be used, which facilitates removal of the carrier after the diffusion element has been applied, or laminated, to the barrier layer.

In typical embodiments, the diffusion element takes the form of a layer or film and is coated on a carrier layer, which may be formed from PET for instance. A temporary cover sheet may be laminated to the holographic image layer. This cover sheet may be easily removed from an uncured holographic image layer. However, the carrier layer is typically difficult or impractical to remove until after the holographic image layer has been cured. Since it is likely in typical applications that the carrier film will need to be removed in order to produce a security document, such as the example security document described later in this disclosure, it is usually advantageous for the diffusion element to be coated onto an appropriate release film.

In order for the formed barrier layer to be able to absorb incident radiation in order to be heated and become passable, the said emulsion layer typically further comprises a radiation-absorbing material, such as an infrared or near-infrared dye. This material may be in the form of a water-soluble powder that may be added to the emulsion for example prior to the applying of the emulsion as a layer over the holographic image layer. The radiation-absorbing material thus enhances, or bestows upon the formed barrier layer region, the radiation-absorbing quality that allows the barrier layer to be heated and thereby transformed by incident radiation. The radiation-absorbing material may in some embodiments be in the form of a dispersion within the emulsion, specifically dispersed throughout the fluid thereof. For example, a dye provided as water dispersion may be added to the emulsion prior to or subsequent to the emulsion being applied over the holographic image layer. Typically the fluid is removed during the forming of the assembly such that the radiation-absorbing material remains as part of the barrier layer or at least the said region thereof.

As described above, the creation of the concentration gradient between the diffusion element and holographic image layer results in net diffusion taking place in a direction defined by that gradient. Accordingly, the direction of the net diffusion may be controlled by the selection of the diffusible substance and its relative concentration in the diffusion element with respect to the holographic image layer region. Thus providing the assembly such that there is a difference between the concentration of the diffusible substance in the region of the diffusion element and in the region of the holographic image layer gives rise to the diffusion-inducing concentration gradient.

This difference may be effected either by providing these two regions with two different, non-zero concentrations of the diffusible substance, or by providing only one of the two regions with a non-zero concentration of the diffusible substance and the other with no amount, or a negligible amount, of the diffusible substance. It will therefore be understood that in this disclosure the intended meaning of a material comprising a diffusible substance at a "concentration" is that the diffusible substance may be present in the material, at a measurable, non-negligible concentration, or it may be present in the material in trace amounts, or it may be entirely absent from the material. Either one of the two regions may comprise the diffusible substance at a concentration as defined in this way, the key requirement being that the second concentration is different from the first concentration. Thus if either one of the first concentration and the second concentration is zero or substantially so, then the other of the first and second concentration will be greater, or at least greater by such a degree that a concentration gradient is created between the two regions that will produce the desired diffusion between the regions through the passable barrier parts.

In the latter of the two general cases outlined above, in which only one of the two regions has a non-zero concentration of the diffusible substance and the other contains no amount, or a negligible amount, of the diffusible substance, the diffusion that is permitted when the barrier is selectively rendered passable has a net direction from the region initially containing the diffusible substance to the region initially devoid, or substantially so, of the diffusible substance. In some embodiments, therefore, either of the first concentration and the second concentration is substantially zero. For instance, in typical embodiments, the holographic image layer as provided will have been cured, for example by way of either or both of optical and thermal curing. Typically the residual concentration of the diffusible substance the remains after this curing is very low, and may be zero or near-zero.

In other embodiments, pertaining to the former of those two general cases, each of the first concentration and the second concentration is substantially greater than zero, with one being greater than the other in order to effect the desired concentration gradient. Thus each of the regions may, in such cases, contain a non-zero, or non-negligible, concentration of the diffusible substance.

In some embodiments, the second concentration is higher, or greater, than the first concentration, such that the said permitted diffusion comprises a net diffusion of the diffusible substance from the said region of the said diffusion element to the said region of the holographic image layer. It will be understood that the diffusion of a substance typically continues until the particles or molecules thereof are equally or homogeneously distributed. During diffusion, particles or molecules of the diffusible substance may typically pass through passable parts of the barrier layer region in both directions. That is, the diffusible substance may pass from the diffusion element to the holographic image layer and vice versa. There is, however, typically an overall movement of the substance from a region of higher concentration to one of lower concentration. The term "net diffusion" is used in this disclosure to refer to this overall redistribution of the diffusible substance. In embodiments wherein the second concentration is greater, the holographic image layer is a net receiver of an amount of diffusible substance. Portions of the holographic image layer that are proximate or close to positions in the barrier layer region wherein the barrier layer is passable are caused to swell or expand as a result of taking on additional material, namely diffusible substance. This causes the hologram, at those portions of the holographic image layer, to decrease in the spatial frequency of its interference structure, that is to say, the spacing between the fringes of the recorded pattern are caused increase. This results in the volume hologram reflecting light in which the hologram is viewable in a colour corresponding to longer wavelengths compared to the viewing wavelength prior to the net diffusion taking place. Thus a red shift is caused.

Alternatively, the multilayer assembly may be provided with relative concentrations of the diffusible substance that will cause a net diffusion thereof out of the holographic image layer once a diffusion path is created between the regions of the holographic image layer and the diffusion element. Typically, in such embodiments, the first concentration is higher than the second concentration, such that the said permitted diffusion comprises a net diffusion of the diffusible substance from the said region of the holographic image layer to the said region of the diffusion element. In this way, if a blue shift is required for forming a pattern, for example, this may be achieved by providing the multilayer assembly with relative concentrations of the diffusible substance in the holographic image layer and diffusion element regions such that the net movement of the substance, once diffusion is permitted, is outward from the holographic image layer, into the diffusion element. This outward diffusion causes a shrinking or contraction in parts of the holographic image layer that lose an amount of the diffusible substance, resulting in an increase in the spatial frequency of portions of the volume hologram pattern, wherein a shorter wavelength response is created, corresponding to the second observable colour.

As alluded to above, the said dimensionally modifying the volume hologram typically comprises modifying the dimensions of part of an interference pattern comprised by the volume hologram. The said part typically corresponds to, or is preferably defined according to, the predetermined pattern. The interference pattern comprised by the volume hologram, which may be understood as an interference structure made up of fringes defined by modulations in the refractive index of the holographic image layer material, is not to be confused with the predetermined pattern, which is on a larger scale than the interference pattern, and is typically in the form of visual data, such as alphanumeric characters or other markings that are to be added to the volume hologram by way of the colour change.

The patterning of the volume hologram may therefore be thought of as selectively, that is for selected parts of the volume hologram, shifting, for example by increasing or decreasing, the spatial frequency of the fringe pattern defining the volume hologram so as to selectively cause a blue shift or a red shift, respectively, of the colour in which the volume hologram is viewable. Typically, therefore, the said dimensionally modifying the volume hologram comprises modifying the spacing between interference fringes, preferably between a plurality of interference fringes, comprised by the volume hologram. The localised changes, that is increases or decreases, depending upon the direction of diffusion, in the spacing between interference fringes of the volume hologram results in the colour-marking. The method typically comprises permitting diffusion of an amount of the diffusible substance between the said regions of the diffusion element and the holographic image layer that is sufficient to modify the wavelength of light in which the volume hologram is viewable. This means that the amount of diffusible substance that is caused or permitted to be redistributed between the holographic image layer and the diffusion element is sufficient to cause a dimensional modification that results in a change in hologram replay wavelength. Preferably, the wavelength at which the volume hologram selectively reflects light, in the sense of the volume hologram being a reflection hologram, is thus altered. It is therefore preferable to control the amount of diffusion that occurs to ensure that the desired wavelength shift is achieved.

Preferably, in addition to the pattern to be applied to the hologram being predetermined, the colour change that is to be effected is also predetermined. Preferably, therefore, the amount of the diffusible substance that is permitted to diffuse between the said regions of the diffusion element and the holographic image layer is sufficient to modify the said wavelength so as to produce a predetermined, or particular desired, colour change. Typically, therefore, the method is configured to produce a predetermined difference between the first and second observable colours. This may be considered as, for example, a minimum shift in wavelength or ratio between first and second colour wavelengths, or peak or average wavelengths for the first and second colours. The predetermined colour change may alternatively be defined in terms of the second observable colour being predetermined, rather than the difference between the said colour and the first observable colour being the criterion defining the change.

It is advantageous, therefore, to control the amount of the diffusible substance that is permitted or caused to diffuse between the said regions of the diffusion element and the holographic image layer, preferably by controlling the diffusion so as to permit only the said amount to be transferred (that is by a net movement or redistribution) across the barrier layer region, or across a particular heat-transformed passable portion thereof. This control may be performed by controlling any one or more of: a rate at which diffusion occurs; an amount of time for which the said diffusion is permitted; and the second concentration, at which the diffusible material is comprised in the region of the diffusion element in the multilayer assembly as provided. It will be recognised that the rate of diffusion, or more specifically net diffusion, is typically dependent upon, and indeed is often proportional to, the concentration gradient that exists between the high- and low-concentration regions. The rate is therefore typically not constant but rather changes during the diffusion process. Typically, the rate decreases as the difference between the two concentration levels is reduced by the net diffusion. The rate that is controlled may be an average rate for the time during which diffusion occurs, or is permitted to occur, such as a mean rate. The rate may also be defined or measured as the initial rate, that is the rate at the time when the diffusion is first permitted, which typically is a maximum rate.

If the amount of time for which diffusion is permitted is to be controlled, this preferably means that the amount of time is controlled to be less than the amount of time that would be required for the diffusion to cease by virtue of an equilibrium being reached, that is by equalised concentrations in the holographic image layer and diffusion element regions being achieved. In other words, such time-control typically comprises interrupting the diffusion at a certain time, once the desired colour change has been effected.

Otherwise, the amount of time for which diffusion is permitted to occur may be controlled to be at least as long as is required for "complete" colour tuning to occur, for a subset of, or all of the rendered-passable parts of the barrier layer. Complete tuning as used in this context means that the diffusion has continued at least until equilibrium has been reached, as described above. Thus, because in such embodiments the amount or degree of colour change induced at the dimensionally modified positions within the holographic image layer is not limited by the diffusion time, it may instead be predetermined effectively by the initial concentration gradient between the holographic image layer and the diffusion element, which in turn is predetermined by the first and second concentrations of the diffusible substance.

Controlling the diffused amount by way of controlling the second concentration typically involves controlling or selecting the concentration or level of diffusible material present in the diffusion element, or the difference between that of the diffusion element and that of the holographic image layer. This control may be performed such that, if the diffusion were permitted to continue until equilibrium were reached, the dimensional modification caused in the holographic image layer would produce the predetermined, or particularly desired, colour or colour change. In other words, it is possible in some embodiments to provide as part of the multilayer assembly a diffusion element that contains the particular concentration or amount of the diffusible substance that is configured specifically such that allowing the concentration levels on either side of heat-transformed passable parts of the barrier layer to equalise will result in the desired colour change being created in the volume hologram pattern portion.

If the rate at which diffusion occurs is controlled, this may be performed by way of any one of a number of different techniques. In some embodiments, this comprises controlling the size of one or more areas that are rendered passable to the diffusible substance at the plurality of positions. The controlled size may preferably be understood as the area, or the two-dimensional extent in the plane of the barrier layer region, of a portion of the barrier layer region that is rendered passable to the diffusible substance. For a given passable area, this may be an average size, or may be measured or defined as a minimum two-dimensional extent in embodiments where the extent is not constant across the thickness of the barrier layer region at the heated position. The passable areas may be considered as being at the plurality of positions in that they correspond in their positions to the heated positions. That is, a position may be a target position for a point or area on the barrier layer corresponding to, and preferably underlying, a point or area on the holographic image layer. In this way, positions may be thought of as points on or within the barrier layer at or corresponding to, the locations of corresponding areas to be rendered passable. For example, the heated positions may define centres of areas to be rendered passable.

The diffusion rate may also be controlled by providing the multilayer assembly such that the difference between the first concentration and the second concentration is predetermined so as to affect a predetermined concentration gradient between the said regions of the diffusion element and the holographic image layer. Thus the said concentrations may be quantitatively known in some embodiments. Each concentration may be known or predetermined, or the relative difference, which may be defined as a difference or ratio of the first and second concentrations, may be known. The difference may be a subtractive difference or a proportional difference, therefore.

A further way of controlling the diffusion rate may be controlling the temperature of the said regions of the diffusion element and the holographic image layer. Typically, the diffusion rate is greater when the temperature of the layer and the element is higher, and slower when the temperature is lower. Therefore, preferably the controlling may be performed by heating the multilayer assembly, for example by placing it in a heated environment such as an oven, to encourage diffusion to occur or accelerate, and reducing the temperature of the assembly, for example by removing it from such an environment, or upon a desired amount of diffusion or degree of colour-change being achieved.

In preferred embodiments, however, the rate of diffusion of the diffusible substance across passable parts of the barrier layer is increased, or maintained at a preferably high level, by way of heating of one or both of the diffusion element and the holographic image layer, particularly regions thereof that are proximal to the passable barrier payer parts, that results from the same heat source that is used for the selective heating of the barrier layer itself. For example, it is envisaged that any manner of radiation beam that may be used for selectively rendering parts of the barrier layer passable would also, in doing so, elevate the temperature, at least locally, of the material either side of each passable barrier layer position, and thereby cause the rate of diffusion across that passable part to accelerate.

If the amount of time for which the said diffusion is permitted is controlled, this may be performed by causing the diffusion to cease by way of any one or more of several means. For example, this may comprise removing either of the diffusion element and the holographic image layer from the multilayer assembly. This removing typically causes the contact, be it direct or indirect, or the diffusion pathway, between the holographic image layer and diffusion element regions being removed.

Causing the diffusion to cease may also be performed by reducing the temperature of the said regions of the diffusion element and the holographic image layer at least to, preferably lower than, a threshold temperature at which diffusion is prevented, or is substantially stopped. Thus the assembly, or the relevant parts thereof, may be reduced to a temperature that is too low for diffusible substance to be transported in the materials of the holographic image layer and/or the diffusion element.

A further means of causing the diffusion to cease may comprise causing at least a portion of the diffusible substance, preferably a portion that is proximal to an area or areas of the barrier layer region that are passable, or more preferably all of the diffusible substance, to be modified so as to become non-diffusible. This typically comprises causing the diffusible substance to undergo a physical or chemical change which causes the substance to cease being diffusible. The term "non-diffusible" may preferably be understood as referring to molecules that are not mobile within the material of the diffusion element and/or the holographic image layer, and so are not able to be transported therein by diffusion. The diffusible substance may be rendered non-diffusible, for example by a process of reacting molecules of the diffusible substance together in a chemical reaction to form the non-diffusible substance. Thus, in some embodiments the said portion of the diffusible substance, and in particular molecules thereof, is caused to be modified by way of being combined or caused to combine to form a non-diffusible substance, for example to polymerize so as to become a polymer. Preferably, molecules of the diffusible substance combined together, and may additionally or alternatively involve being combined with molecules of another substance. As is discussed in further detail below, a diffusible substance may be used that is an unpolymerized form of a polymer comprised by the holographic image layer material. In this way, the diffusible substance may be caused to become non-diffusible and in doing so become or add to the material of the holographic image layer, for example a photopolymer material.

In some embodiments, causing the diffusible substance to be modified so as to become non-diffusible comprises, or is achieved by, exposing the said portion to actinic radiation. This may typically be understood as radiation having a wavelength and intensity configured to cause a photochemical reaction that causes the diffusible substance to become a non-diffusible substance. As alluded to above, this reaction may in some embodiments be a photopolymerization reaction.

This "fixing" of the holographic image layer after the desired colour change has been effected therein is advantageous in that it may slow down or stop any diffusion of the diffusible substance that may occur within the holographic image layer itself. In absence of this fixing step, even if further diffusion through the barrier layer is prevented by the transformed regions thereof returning to an impassable state, for example, the colour-shifted parts of the holographic image layer, in which localised region of either increased or decreased (depending upon the direction of the initial concentration gradient defined by the first and second concentrations) concentration of the diffusible substance relative to the concentration thereof in the unmodified portion of the holographic image layer region has been created by the diffusion through the barrier layer, may cause further diffusion. This resulting diffusion of the diffusible substance between the dimensionally modified parts of the holographic image layer region and the unmodified parts, which are typically not subjected to any substantial diffusion resulting the patterned heating of the barrier layer, may deleteriously cause the definition, or the colour contrast, between the hitherto modified and unmodified portions of the holographic image layer to be reduced, as a consequence of diffusible substance "spreading" or diffusing out of red-shifted parts comprising an increased concentration of the diffusible substance, or, conversely, of the substance diffusing into blue-shifted, reduced-concentration parts. Either of these post-patterning diffusion effects typically causes the boundary or edge regions between modified and unmodified parts of the holographic image layer to become larger or more blurred, and causes the produced colour difference between those parts to be reduced, thereby reducing the definition or resolution, and the colour contrast, respectively, of the pattern to be reduced. Because of this, it is desirable to halt any diffusion within the holographic image layer at least, by exposing it to actinic radiation for example.

Controlling the colour change may be performed by way of monitoring the appearance of the holographic image layer. For example, the appearance may be monitored so as to identify when the patterned parts of the volume hologram have taken on the second observable colour, and so have undergone the desired colour change. Therefore, the method may further comprise monitoring a colour in which the volume hologram is viewable at the one or more of the plurality of positions within the said region of the holographic image layer, and controlling the amount of time for which the said diffusion is permitted by causing the diffusion to cease when the monitored colour is the second observable colour.

This may comprise illuminating the volume hologram with light having, and preferably comprising only or predominantly, a wavelength or wavelengths corresponding to the second observable colour. Typically, therefore, a modified portion will thus not be discernible, or will be invisible, until the degree of dimensional modification in that portion is sufficient to cause the portion to be viewable in the second observable colour, whereupon the portion will become visible under the aforementioned specific illumination conditions. Therefore, by illuminating the volume hologram in this way, monitoring the volume hologram, and causing the diffusion to cease, for example by any of the above described methods, when the modified portions become visible, a pattern having a specific desired, that is second observable, colour may be produced.

It is desirable in some embodiments to stop the diffusion process at a precise time, once the desired colour shift has been achieved. It is also envisaged, however, that discernible personalisation patterns could be produced in the volume hologram without precisely knowing or defining the particular colour shift, but merely requiring that a colour shift that allows markings or personalisation data to be seen on the hologram has been produced.

Using the method, it is possible, starting with a volume hologram that is uniformly viewable in the first observable colour, to create a pattern on the volume hologram that may be distinguished by a viewing user by way of the hologram being viewable in the second, different, observable colour. Typically, therefore, the said dimensional modification of the volume hologram preferably occurs only in, or is confined to, one or more modified portions of the region of the holographic image layer. In this way, only one or more portions of the volume hologram is dimensionally modified. The said modified portions are typically arranged to correspond to the predetermined pattern, and typically at least one unmodified portion of the region of the holographic image layer remains viewable in the first observable colour. The unmodified portion or portions are preferably dimensionally unmodified. That is to say, the interference patterns comprised by the volume hologram in those portions retains the same dimensions, in particular the same spacing, as in the holographic image layer as provided. Preferably the modified portion or portions are contiguous, or substantially contiguous, with the unmodified portion or portions. This typically means that the portions of the volume hologram that are viewable in the first observable colour are immediately next to, or touching, portions that are viewable in the second observable colour. Typically, however, such a discontinuity in the dimensional modification being applied across the holographic image layer is difficult to achieve. There may exist, between any given modified and unmodified portions, an intermediate portion in which the colour in which the volume hologram is viewable is intermediate between the first and second observable colours, and typically also varies across a zone or band separating a modified portion from an unmodified portion.

The volume hologram being dimensionally modified may be thought of as a dimensional modification being caused to the volume hologram. Preferably, this modification is permanent, and the colour shift remains at the desired level without shifting back to or towards the first observable colour, or shifting further, that is beyond the desired level, which is the second observable colour, and away from the first observable colour. For example, the change to the spatial frequency of the volume hologram may be halted when the desired colour is achieved and the second observable colour remains in the modified portions. It will be understood, therefore, that preferably the volume hologram region is permanently patterned as a result of the diffusion. It is preferred for security applications that the dimensional modification of the volume hologram is irreversible in a sense that at least no further processing technique exists which might reasonably return the volume hologram structure to a reasonable facsimile of its former state, or appearance, which it may have had prior to the patterned diffusion process being applied, without causing substantial damage to or destroying the security device itself. Preferably, therefore, the dimensional modification of the volume hologram is irreversible.

It is also, therefore, advantageously difficult or impossible for the pattern to be removed, since doing so would require the discernible difference in observable colour between the modified portions (the pattern) and the unmodified portions to be removed or rendered not discernible. This would require the precise application of a reverse diffusion process that would cause diffusion in a reverse direction to that of the method, in order to apply a reverse modification to the modified region so as to cause a colour shift of those portions of the hologram back to, or approximately to, the first observable colour. Such a precise reversal of the patterned swelling or shrinking of the holographic image layer would be practically very difficult, and possibly impossible, thus enhancing the security level of the device.

The said dimensional modification may be rendered irreversible by way of, after the said dimensional modification has been effected, removing, or substantially removing, the diffusible substance from the multilayer assembly. Specifically, this typically involves removing the diffusible substance from the said region of the holographic image layer and/or the said region of the diffusion element. Removing in this sense may be performed by causing the diffusible substance to become a non-diffusible substance, as discussed above. For example, this may comprise causing a diffusible monomer having small, mobile molecules to polymerize to become a polymer that has larger, immobile molecules or a matrix of molecules, that are preferably fixed in position with respect to the holographic image layer and/or the diffusion element. Thus in embodiments wherein the holographic image layer is formed from a photopolymer and the diffusible substance is a diffusible monomer for example, the diffusible substance may be immobilized, post-patterning, by an overall exposure of the multilayer assembly, or a security device comprising the same, to actinic radiation, such as ultraviolet radiation. This effects photopolymerization of said monomer, thereby removing the diffusible substance by rendering it non-diffusible.

The removal of diffusible substance from the assembly, in additional to rendering the dimensional modification irreversible, has the advantageous effect of improving the environmental stability of the produced security device. It is possible that such a produced device might be exposed to elevated temperatures that could compromise or render passable the barrier layer and thereby cause unwanted diffusion and dimensional modification to the holographic image layer. Substantially removing the diffusible substance mitigates the risk of deleterious colour changes occurring in such scenarios, since there is no, or negligible, remaining diffusible substance to diffuse across the compromised barrier layer.

In other embodiments, the removal of the diffusible substance may comprise removing the said substance from the assembly by removing the diffusing element itself from the assembly, so as to remove from the assembly any diffusible substance that is within the diffusion element, and preferably substantially concurrently, or subsequently removing any diffusible substance that is within the holographic image layer, for example by converting it to a non-diffusible substance.

In some embodiments, both the diffusion element and the barrier layer may be removed after the said dimensional modification has been effected. In such cases, the holographic image layer may still be thought of as being comprised by the assembly while the diffusion element and the barrier layer are removed from the assembly. Indeed, the multilayer assembly may typically, but not necessarily, comprise further layers in addition to the holographic image layer once the diffusion element and/or the barrier layer have been removed.

Typically, the diffusible substance has a refractive index different from a refractive index of a component, for example a binder, of the material from which the said region of the holographic image layer is formed.

In typical embodiments, and in particular ones in which the net diffusion is such that diffusible substance is transported into the holographic image layer, the diffusible substance comprises, or preferably is, a monomer. This arrangement can allow the monomer to diffuse into the holographic image layer region and then be polymerized once the desired colour shift has been achieved. Preferably, the monomer is a liquid monomer. The monomer may, for example, be an ethylenically unsaturated compound capable of additional polymerization. Preferably, the monomer has a boiling point above 100° C.

In such embodiments, the said material from which the said region of the holographic image layer is formed may comprise a polymer material comprising the monomer. That is to say, the structural unit of the polymer preferably is or comprises the monomer. Typically, a polymer has a molecular structure built up chiefly or completely from a plurality of repeating units, and so the holographic image layer may be formed from or comprise a polymer material that comprises repeating units that comprise the monomer and are bonded together. In some embodiments, the polymer material may comprise a monomer, different from the diffusible substance monomer, that is optically similar to or compatible with the said diffusible substance monomer.

In some embodiments, the diffusible substance may comprise a plasticizer and/or a solvent.

It will be appreciated that the diffusion element may be provided in any form suitable for permitting a diffusion pathway to be created between it and the holographic image layer region via a passable portion of the barrier layer region. Preferably, however, the diffusion element is a diffusion layer. This may typically be a layer in the form of a film, and preferably a solid film. The term "film" as used in this context may be understood as referring to a sheet of material that is preferably thin and flexible. In some embodiments, the holographic image layer is formed from a photopolymer or a film of photosensitive material that may contain a binder substance. In embodiments wherein the diffusion element is formed from or comprises the polymer material that serves as the said binding material, or is a compatible transparent material, then the diffusion element may preferably be permanently laminated to the assembly. In this way, the diffusion element itself may act as a protective layer or a carrier layer on the assembly after having carried out its diffusion patterning function. In other embodiments, the diffusion element may be removed after the patterning diffusion has taken place.

Providing the diffusion element in the form of a layer is advantageous in that the multilayer assembly may have the form of a multilayer film while retaining the diffusion layer. Thus the entire assembly or film may be incorporated into a thin or planar security device together with optional further layers.

It is preferable, particularly when the diffusion element is in the form of a layer, to form the diffusion element from a material that may be left attached to the multilayer assembly after the pattern has been created, without impeding the visual effect provided by the hologram or the pattern therein. As indicated above, the said region of the holographic imaging layer may therefore preferably comprise a binder substance, which may preferably be a substance, such as a polymer, that is used to bind components of the material of the holographic image layer region. The binder in the holographic imaging layer preferably has a very low refractive index, which is chosen so as to maximize the difference between it and that of the diffusible substance, such as monomers, which typically have relatively high refractive indices. This in turn maximizes the amplitude of the refractive index modulation, and therefore the hologram visibility. Preferably, this low-refractive index binder is not used in the diffusion element.

The diffusion element, in some embodiments, may be of a form that is unsuitable for being used in a planar security article for example. For instance, the element may have the form of a thick substrate, a block, or some other piece of bulk material. It is therefore beneficial in such embodiments to remove the diffusion element after patterning has taken place. It may also be beneficial to remove the barrier layer, particularly if the said barrier layer has optical properties that diminish or interfere with the appearance of the volume hologram or its colour pattern. This removal may advantageously result in an overall thinner security device, as well as halting the diffusion if so required, as discussed earlier in this disclosure. Preferably, therefore, the method further comprises removing the diffusion element after the said dimensionally modifying the volume hologram.

In typical embodiments, the method further comprises providing a carrier layer as part of the multilayer assembly. The carrier layer is preferably a self-supporting layer or film of material. For example, it may be formed from or comprise a polymer material. The carrier layer is preferably capable of mechanically supporting other layers of the multilayer assembly, and particularly the holographic image layer. The multilayer assembly may therefore comprise the carrier layer when it is provided, for example in embodiments wherein the multilayer assembly is provided as part of a security article that contains additional layers. Advantageously, the method allows the patterning of such an assembly in spite of the assembly already having been formed or integrated into a security article. Further layers may be formed from a polymer material such as a polycarbonate material. Preferably in such embodiments, the said carrier layer is applied over the holographic image layer. This may involve the carrier layer being adhered to or laminated to the holographic image layer, or to a further layer interposed between the two for example. The carrier layer is preferably applied such that the holographic image layer is interposed between the carrier layer and the barrier layer. Preferably, the said carrier layer is applied at least over the said region of the holographic image layer. The carrier layer is typically a protective layer and is typically in the form of a film of material. The carrier layer is preferably optically transparent, at least in the physical region of the electromagnetic spectrum, or at least in the bands of the electromagnetic spectrum corresponding to the first and second observable colours. The carrier layer may also preferably be transparent to radiation that is used to apply heat to the barrier layer region, for example infrared or near-infrared, or radiation to which the barrier layer is opaque. The carrier layer may then be comprised by the multilayer assembly as provided, and radiation may be directed through the carrier layer so as to heat the barrier layer region and pattern the holographic image layer region.

In some embodiments the method further comprises providing one or more further layers as part of, or comprised by, the multilayer assembly, the said one or more further layers being applied at a side of the assembly distal to the holographic image layer, that is preferably on an opposite side of the barrier layer to the holographic image layer. The further layers may be on a side of the assembly opposite or distal to the carrier layer if the carrier layer is present. The one or more further layers may be applied over, and are preferably applied so as to be coplanar with, a major surface of the barrier layer or the diffusion element if the latter is in the form of the layer.

Due to the limited range of wavelengths and angles over which diffraction typically occurs in the volume hologram, which correspond to the colour in which the volume hologram is viewable, it is possible to have multiple volume holograms inside the same volume of material in the holographic image layer region. Therefore, in a given region of the holographic image layer, multiple volume holograms may be recorded which work independently of one another and do not interfere with one another. For instance, in some embodiments, two volume holograms may be recorded in the same region of the holographic image layer for two different Bragg wavelengths at the same incident angle, and the device may diffract the two selected wavelengths into different output directions with limited crosstalk. In some embodiments, therefore, the said region of the holographic image layer, of the multilayer assembly as provided, comprises one or more further volume holograms, wherein each volume hologram is viewable in a different observable colour.

Where the holographic image layer is provided with multiple volume holograms encoded in it, each of the said volume holograms may be, or may serve as, a respective colour component of a multi-colour composite hologram. In this way each of the said holograms may contribute a colour component, for example a single-colour component, of a multi-colour composite holographic image. It will be understood that multi-colour holograms which may for example use an RGB colour model can be produced by recording multiple, typically three, monochromatic or substantially monochromatic volume holograms in the holographic image layer. These may be viewable, for instance, in red, green, and blue colours or wavelength bands, respectively. Thus a multi-colour or full-colour reconstructed holographic image may be exhibited by the holographic image layer as provided before patterning. The interference fringes of each of the volume holograms will still typically be dimensionally modified by the localised diffusion process, and so the colour-patterning process may be used to mark or personalise a multi-colour hologram also.

Preferably, in the provided multilayer assembly, the said region of the barrier layer is completely overlapping with a region of overlap between the said regions of the holographic image layer and the diffusion element. That region of overlap may be defined as the region in which the said regions of the holographic image layer and the diffusion element overlap. The region of overlap may also comprise any number of subregions, if for instance the said holographic image layer and diffusion element regions have complex shapes that give rise to discrete or discontinuous overlapping subregions. It is preferable that the said regions of the holographic image layer and the diffusion element are completely overlapping. This maximizes the proportion of a given holographic image layer region that may be patterned by selective, localised diffusion, by providing diffusion element region, and therefore potential diffusion pathways wherever the barrier layer region is rendered passable, for all of the holographic image layer region.

The method may be used with any suitable type of volume hologram. In typical embodiments, the said volume hologram is a reflection hologram. It will be appreciated that the nature of the volume hologram depends upon the manner in which the interference pattern has been recorded in the holographic image layer region. Specifically, the difference depends upon the direction of the incident and diffracted light, and this depends upon the orientation of the interference fringes within the holographic image layer, this being governed by the directions of the light beams used to record the hologram with respect to the holographic image layer. For embodiments wherein the security device is to be incorporated into a security article comprising additional layers, for example, especially opaque layers on one side of the formed device or holographic image layer, it is preferable that the volume hologram is a reflection hologram.

In accordance with a second aspect of the invention there is provided a security device made in accordance with the method according to the first aspect.

In accordance with a third aspect of the invention there is provided a security article comprising a security device according to the second aspect, wherein the security article is preferably a polymer substrate such as an identity card, a passport datapage, or a security thread, strip, patch, label, or transfer foil.

In accordance with a fourth aspect of the invention there is provided a security document comprising a security device according to the second aspect, or a security article according to the third aspect, wherein the security device or security article is affixed to a surface of the document, or is preferably located in a transparent window region of the document, or is inserted as a window thread.

In accordance with a fifth aspect of the invention there is provided a security device comprising: a holographic image layer having a region comprising a volume hologram of which at least one unmodified portion is viewable in a first observable colour, wherein at a plurality of positions within the said region of the holographic image layer and defining a pattern, the volume hologram is dimensionally modified so as to be viewable in a second observable colour, different from the first observable colour. Advantageously, the volume hologram itself can exhibit a pattern by virtue of the visible colour of, or the colour exhibited by, the volume hologram being modulated across the plane of the holographic image layer region. This colour modulation typically exists by virtue of the dimensions, specifically the spatial frequency, of fringes in the interference pattern being modulated so as to be greater or smaller in selected, patterned areas.

The said plurality of positions within the said region of the holographic image layer may correspond to the pattern, and the said pattern may be in any form that is desired for the particular application. Preferably, the said dimensional modification is typically produced by selective, colour-shifting diffusion of a diffusible substance in or out of the holographic image layer at a plurality of positions therein. Preferably, this is performed by rendering a barrier layer passable to that diffusible substance at those positions. Thus the volume hologram is typically dimensionally modified at the said positions, and the dimensions of the hologram structure are different from, or in other words are modified with respect to, the dimensions of the hologram in its unmodified portion.

The modified positions may thus give the appearance of coloured markings, specifically markings of a different colour from the rest of, or surrounding, volume hologram portions. In this way, the volume hologram is enhanced by, in addition to giving rise to a reconstructed holographic image, a pattern. Patterned, modified parts of the volume hologram may be thought of as patterned subregions of the holographic image layer region. Preferably, the patterned subregions are contiguous with and are preferably surrounded by unmodified portions or an unmodified portion of the holographic image layer region. The difference between the first and second observable colours typically means that a pattern is visible in a different colour from the rest of the volume hologram, and typically the unmodified portion(s) surrounding the modified, patterned, or colour-changed areas represents the aforementioned rest of the volume hologram. The security device therefore exhibits a novel visual effect such that the said pattern is distinguishable, for example to a viewer, by at least a contrast between the first and second observable colours.

The visual effect exhibited by the security device may be made more striking to a viewer by increasing any one or more of: colour contrast between the first and second observable colours, the complexity of the pattern produced by the localised colour-shift, and the spatial resolution of the pattern. Increasing the resolution is preferable, since the enhanced degree of detail that may be made visible in the colour patterns with which the volume hologram is enhanced in the present invention has hitherto not been possible to produce with conventional techniques without significantly more complex patterning equipment, restrictive manufacturing requirements, and greater colour instability in the produced assemblies, and so the presence of precisely localised portions within a hologram that exhibit a different colour from the rest of the hologram would be recognised by an authenticator as a novel and memorable effect that is in turn difficult to replicate.

Each modified portion of the volume hologram, which exhibits the second observable colour and so is distinguishable by its contrast with the parts of the volume hologram that are visible in the first observable colour, may be thought of as a pattern element. It is by increasing the resolution of these pattern elements, without the above noted disadvantages entailed in the use of prior art techniques for colouring holograms, that complex and more practically useful visual information may be marked into a hologram by colour modification. Preferably, therefore, the resolution, or the width of the pattern elements, is minimized. More preferably, one or more of the pattern elements comprised by the holographic image layer region may have a width less than a specific desired width. The width of the pattern element may be defined or measured as the extent of a pattern element from one side of the element to the other, and may, for instance, be measured as the diameter of a circular pattern element, such as a dot, which may for example serve as a dot in a dot matrix pattern. In some preferred embodiments, one or more pattern elements may have a dimension smaller than 1 mm, for instance, or more preferably smaller than 500 µm, 100 µm, or 80 µm. In this way the security device may comprise pattern elements that are narrow or precise enough to create complex patterns and carry a significant amount of visual information and detail, while also being visible to the human eye. The pattern elements may be smaller than a specific size, such as any of the above example sizes, in two orthogonal dimensions. This may be preferable in embodiments wherein the pattern elements are formed as dots making up a dot matrix pattern, as alluded to above.

In some embodiments, the pattern comprises indicia, in particular such that the indicia are visible in a colour different from the colour exhibited by non-patterned parts of the volume hologram. The indicia may comprise any one or more of an alphanumeric character, a symbol, a logo, or an image.

In some embodiments, the said region of holographic image layer is formed from a material which, at the said plurality of positions within the region, comprises a diffusible substance at a first concentration, and which, in the said at least one unmodified portion, comprises the diffusible substance at a second concentration, different from the first concentration. Alternatively, there may exist a concentration difference, for example by selectively located diffusion in or out of the holographic image layer region, which may be used in producing the security device to create dimensional modulation and so colour modulation or patterning. Subsequently, the concentration may be changed by process such as a polymerization reaction of a diffusible monomer. The first and second concentrations as referred to here are typically unrelated to the first and second concentrations described in connection with the first to fourth aspects.

It may be preferable to provide the security device without a barrier layer and/or a diffusion element that are used to produce the device. For example, one or both of these components may be removed from the device after the production of the colour pattern in the holographic image layer. In some embodiments, however, the device comprises a multilayer assembly, the said assembly comprising: the holographic image layer; and a barrier layer having a region that is impassable to the diffusible substance. Typically, the said region of the barrier layer comprises a heat-transformable material. However, it is envisaged that a material may be used to form the barrier layer that is no longer heat-transformable after it has been used once in patterning the volume hologram. The multilayer assembly may further comprise a diffusion element having a region that overlaps the said region of the holographic image layer, and the said region of the barrier layer may be interposed between the said region of the holographic image layer and the said region of the diffusion element so as to preclude diffusion of the diffusible material therebetween.

In accordance with a sixth aspect of the invention there is provided a security article comprising a security device according to the fifth aspect. The security article is preferably a polymer substrate such as an identity card, a passport datapage, or a security thread, strip, patch, label, or transfer foil.

In accordance with a seventh aspect of the invention there is provided a security document comprising a security device according to the fifth aspect or a security article according to the sixth aspect, wherein the security device or security article is preferably affixed to a surface of the document. The security device or security article may be located in a transparent window region of the document, or may be inserted as a window thread.

BRIEF DESCRIPTION OF THE DRAWINGS

Examples according to the present invention are now described, with reference to the accompanying drawings, in which:

FIG. 3 shows a section view of a part of a security device according to examples of the invention with a portion dimensionally modified in two different ways, together with an unmodified part of the same security device according to those examples;

DESCRIPTION OF EXAMPLES

Figure 1:
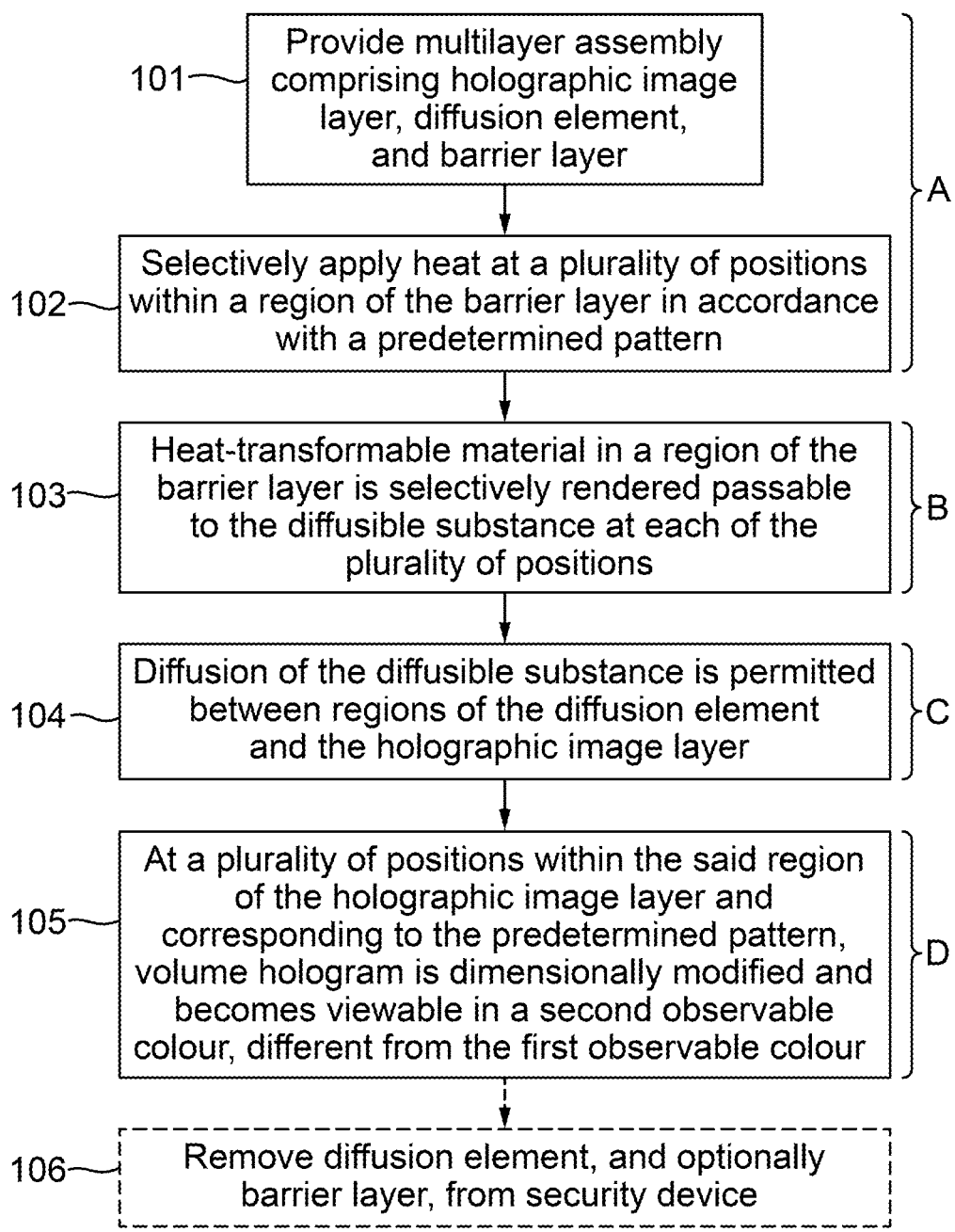
FIG. 1 is a flow diagram of a general method applicable to each example.
Figure 2:
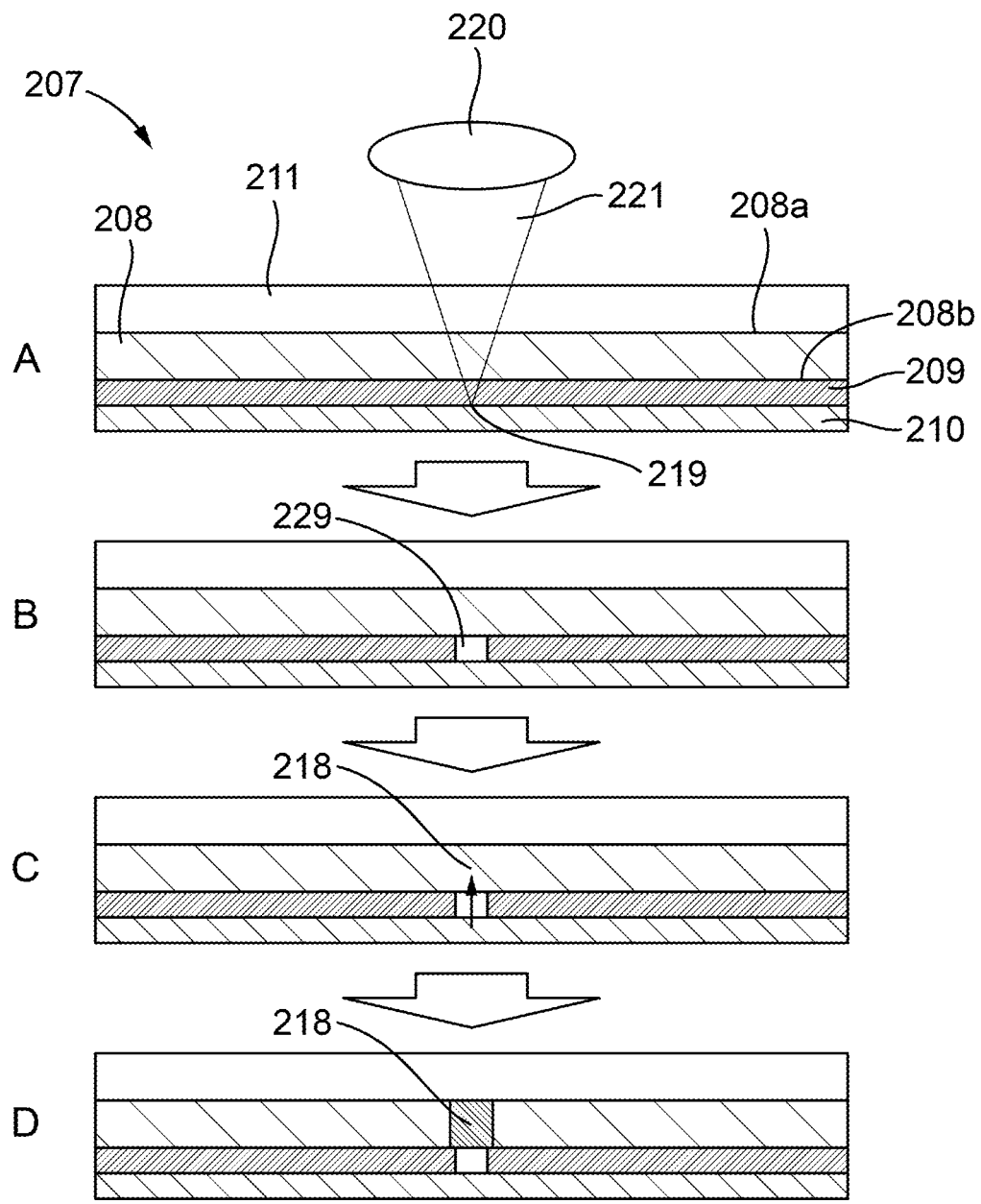
FIG. 2 shows a section through a security device at several stages of being formed by a first example method according to the invention.

We now describe a number of different examples of methods of forming security devices. Common to each of these example processes is a general method of forming a security device and this is now firstly described with reference to FIGS. 1 and 2. FIG. 1 is a flow diagram of the key stages in the process of forming a security device, and FIG. 2 illustrates schematically different stages during an example security device production method to which the general method of FIG. 1 is applicable.

At step 101 a multilayer assembly is provided, the assembly comprising a holographic image layer, a diffusion element, and a barrier layer. In the present example the assembly 207 comprises only the three aforementioned components and a protective layer 211. It is envisaged, however, that further layers may be present in the assembly also, as discussed later on in this disclosure. The holographic image layer is in the form of a cured photopolymer layer 208 in which a volume hologram (not shown) has been pre-recorded. In the present example the provided holographic image layer is a fully processed holographic optical element (HOE). The HOE comprises a diffuse holographic reflector prepared by way of imaging holographic recording film, and then an overall UV curing step, followed by heat processing.

Bonded to the surface 208b of the holographic image layer 208 distal to the protective layer 211 is the barrier layer 209, which in the present example is a paraffin wax layer. In the present example this layer is formed from a non-ionic paraffin wax emulsion. One such emulsion that is available is Michem® Emulsion 47950 from Michelman Inc. (Cincinnati, OH, USA). There are also other Michelman emulsions that could be used to form the barrier layer instead. One such example is Michelman emulsion ML723, which is a paraffin wax emulsion with a smaller particle size of 0.1 µm, whereas the particle size in ME47950 is 0.3 µm.

The wax layer has been modified so as to absorb radiation at a wavelength corresponding to that emitted by a laser device 220 that is to be used to personalise the hologram. Specifically, the barrier layer 209 comprises an infrared-absorbing dye, corresponding to the intended laser wavelength. In a typical example, the emission wavelength of the laser device 220 and the absorption wavelength with which the barrier layer 209 is configured is approximately 1 µm. The presence of the radiation-absorbing component of the barrier layer means that the barrier layer is deformable in response to laser heating. The absorptive component in the present example is a near-infrared dye, which is provided as a water dispersion for the production of the barrier layer. An example of such a product, which may be added to the wax emulsion for this purpose, is NIR1054WD, which is available from QCR Solutions Corp. (Port St. Lucie, FL, USA). Also available, as well as water dispersions, are water-soluble dry powders than can be incorporated into the barrier layer material to render the barrier layer responsive to the desired radiation wavelength. An example is NIR1054B which is also available from QCR Solutions Corp. (Port St. Lucie, FL, USA).

The wax barrier layer in the present example has been formed on the holographic image layer 208 by applying the emulsion, within which the soluble infrared dye is dissolved, directly to the holographic image layer as a coating on the surface 208b via a gravure coating process. The emulsion layer is then dried so as to remove the water therefrom, leaving a 3-4 µm wax barrier layer 209.

The barrier layer 208, being formed from an aqueous wax dispersion, results in a hazy appearance. It is preferable, however, for the barrier layer to be optically clear, at least in the wavelengths of light in which the device is to be viewed. This may be addressed by way of a heat treatment which causes the wax particles to coalesce, so as to give a clear appearance to the barrier layer. To effect this, the entire multilayer assembly, or a security device incorporating it, may be heated after the patterning process has been performed. Alternatively, it is also possible, and may be more convenient, to address the barrier clarity issue earlier, when the multilayer assembly is being assembled. In particular, after coating and drying of the wax layer on to the holographic image layer, the barrier-coated holographic image layer may be heated in order to cause the clarity-improving wax particle coalescence at that stage of the process.

Co-bonded with the barrier layer 209 is the diffusion element 210, which is in the form of a layer having a thickness of 24 µm in the present example, although it envisaged that a diffusion layer as thin as 12 µm may be used in some cases if thinner assemblies are required. The diffusion layer 210 contains a diffusible monomer and a binding agent, and may be thought of as a colour-tuning film.

The diffusion element and the holographic image layer may be prepared according to the techniques, and comprising the materials, described in U.S. Pat. No. 3,658,526 and EP 0407771 B1 for instance.

The present example includes, as noted above, a protective layer 211 bonded to the surface 208a of the holographic image layer distal to the barrier layer 208. In the present example the protective layer 211 is formed from polyethylene terephthalate (PET).

At step 102 heat is selectively applied at a plurality of positions within a region of the barrier layer 208 in accordance with a predetermined pattern. This stage is depicted at A in FIG. 2. The infrared laser device 220 is controlled so as to focus the infrared laser beam 221 at the selected positions in the barrier layer 209. In the figure, the beam 221 is shown as impinging at a single position 219 in the barrier layer 209. This is for simplicity of illustration only, as the method involves causing the laser beam 221 to impinge at a plurality of locations in the barrier layer 209. FIG. 2 effectively shows the formation of a single colour-shifted "dot" or pixel of a predetermined pattern that is to be applied to the holographic image layer. As shown in the figure, the laser beam 221 is directed on to the barrier layer 209 by passing through the protective layer 211 and the holographic image layer 208. This is possible due to the protective layer and the holographic image layer being formed from materials that are not absorbent at the wavelength of the laser beam 221, so that those layers are not heated, or are only heated minimally.

At step 103, depicted at B in FIG. 2, the heat-transformable material in a region of the barrier layer 209 is selectively rendered passable to the diffusible substance, namely the diffusible monomer in the present example, at each of the plurality of positions within the barrier layer 209.

The passable part 229 of the barrier layer that is formed at the heated position 219 therein is shown schematically at B, and in the present example is a region of the barrier layer, which contains a near-infrared dye, that has been heated and consequently melted in response to the infrared laser beam 221 impinging on the barrier layer within that region. The locally melted region 229 is passable to the diffusible monomer, and so diffusion of the monomer through the melted wax 229, between the diffusion element 210 and the holographic image layer 208, is initiated, at 104.

In some alternative examples, the barrier layer is adapted to form voids, as opposed to locally melted regions, in response to localised heating. In such implementations, the laser device 220 may be a femtosecond laser device instead of an infrared laser device. Thus the femtosecond laser device may be configured to cause rapid, localised heating in the barrier layer in order to produce voids in the barrier layer in accordance with the predetermined pattern. A barrier layer formed from a polyvinyl alcohol (PVA) material, for example, may be used in such embodiments. For example, it has been found that a 3-4 µm thick layer of PVA, made from Elvanol® 90-50 (Kuraray America Inc., Houston, TX, USA) is particularly suitable for use as the barrier layer in these implementations.

The depicted passable region 229 shown at B may accordingly be a void or gap 229 having been formed at the heated position 219 in the barrier layer 209 in some implementation. Accordingly, the absence of the diffusible substance-impassable material, namely the monomer-impassable PVA material of the barrier layer 209 from the heated position 219 thereof, in the form of the gap 229, means that diffusion of the diffusible monomer is permitted, at 104, between the regions of the diffusion element 210 and the holographic image layer 208.

Whether the passable parts of the barrier layer are created by way of local melting or the formation of gaps, it is beneficial for the diffusion rate to be accelerated by way of elevating the temperature of the diffusion element region and the holographic image layer region, at least at the parts of those regions that are proximal to the locations in which a colour change is desired according to the predetermined pattern. In the present example, this heating is provided as a secondary heating effect of the laser beam 221 that is used primarily to heat the barrier layer so as to selectively render it passable.

In this example, the laser device 220 is configured such that the temperature of the parts of the diffusion element and holographic image layer regions that are proximal to the heated positions within the barrier layer is maintained in the range 140-150° C. for a duration of 8-12 minutes.

These temperatures and dwell times are used to essentially achieve "complete" tuning, as described earlier in this disclosure. That is, subsequent heating, or otherwise allowing further diffusion to occur, results in no or negligible additional colour change, since equilibrium has already been reached. However, it is possible to achieve a colour-shift using significantly shorter heating durations, such that the monomer diffusion process will not have reached equilibrium before the heating is ceased. For example, the laser heating dwell time may be configured to be as little as two minutes, maintaining the temperature of the locally heated parts of the assembly at 140° C. It has been found that these parameters, used in combination with materials as described above, results in a substantial red shift in playback wavelength.

In the present example, the diffusion layer 210 contains the monomer at a higher concentration than the holographic image layer 208. Specifically, in this case the holographic image layer 208 contains substantially no unpolymerized monomer, and so the concentration of the monomer in the holographic image layer is substantially zero. The higher concentration of the diffusible monomer in the diffusion element 210 means that the diffusion gradient between the holographic image layer 208 and the diffusion element 210 through the void 229 is directed such that, when diffusion is permitted, as shown at stage C, the net diffusion direction is from the diffusion layer 210 to the holographic image layer 208. This is indicated by the arrow in the figure between these two layers.

It is also envisaged that, in other examples, the diffusible substance and the concentrations thereof in the diffusion element and the holographic image layer may be selected so as to cause diffusion in the reverse direction, that is from the holographic image layer to the diffusion element. A diffusible substance such as a plasticizer may be selected for such embodiments, for instance.

As a result of the monomer diffusing through the interruption 229 in the barrier layer 209, localised swelling is caused at a position 218 within the holographic image layer 208 adjacent to the interruption 229, where the holographic image layer 208 receives the diffused monomer. This occurs at each of the further interruptions (not shown) that are formed in the barrier layer 209. Thus, at 105, at a plurality of positions 218 within the region of the holographic image layer 208 and corresponding to the pattern being formed in that layer, the volume hologram is dimensionally modified, by the swelling of the Bragg planes by the diffused monomer, which causes a red shift in the hologram replay. In this way, as indicated at D, the volume hologram becomes viewable in a second observable colour, different from the first observable colour, at the positions 218 at which the holographic image layer 208 is modified.

After the desired colour change at the positions 218 has been achieved, it is desired to prevent any further diffusion between the diffusion layer 210 and the holographic image layer 208. This may optionally be performed by removing the diffusion element, at 106, as well as, optionally, removing the barrier layer from the holographic image layer. The interruptions 229 created during the patterning process by the laser may in some cases be permanent voids that remain as interruptions in the barrier layer indefinitely after they have been created by the laser. In these cases it is typically desired to halt the diffusion process once the desired colour change has been achieved by intervention such as the layer removal mentioned above. In other cases, the interruption created in the barrier layer at a heated location therein may disappear at some time after being heated by way of the wax at the barrier layer location 219 temporarily melting and then re-solidifying to form an impassable region once again.

The colour shift is "fixed" typically by polymerizing the monomer in the holographic image layer 208 after the diffusion has taken place so as to cause the desired colour change. This is performed in the present example by a step (not shown) of exposing the entire holographic image layer to actinic radiation, specifically ultraviolet radiation, that causes this polymerization. In addition to the fixing of the holographic image layer 208, UV exposure of the diffusion element 210 is also performed, which results in polymerization of monomer in the diffusion element. This prevents further diffusion between these layers should the barrier layer 209 be compromised, by heat exposure for example. The overall UV curing step may be applied to both these layers simultaneously, since the holographic image and barrier layers are sufficiently transmissive to UV light to allow optical curing of the underlying diffusion element when UV radiation is incident on the holographic image layer side of the assembly. It has also been found that the wax barrier layer is sufficiently transmissive to UV light to permit this simultaneous curing. This has been found to be the case regardless of whether the barrier layer has undergone a prior heat processing step to coalesce the wax particles, as described above.

FIG. 3 shows schematically how the colour change at the localised portions of the holographic image layer is achieved. At each of A, B, and C a section of a holographic image layer comprising a reflection volume hologram is shown. At A an unmodified portion 317 of the holographic image layer 308 is shown. B and C depict a portion 318 of the layer 308 has been modified, by swelling and shrinking the holographic image layer material respectively. Thus at B and C a red-shifted and blue-shifted, respectively, modified portion 318 is surrounded by unmodified holographic image layer portions 317.

The interference fringes of the volume hologram, which are defined by a modulation in the refractive index of the holographic image layer material, are depicted schematically as being uniformly spaced and parallel. It will be appreciated that, in practice, a holographic image layer in which a holographic image is viewable will comprise a complex pattern of non-uniform fringes arranged according to the recorded image, and that the perfectly uniform and parallel arrangement of the fringes 333 in the present figure is for simplicity of illustration only.

The holographic image layer 308 depicted in FIG. 3 has a thickness of 20 μm. The dimensions of the holographic image layer itself, and of the region of the layer that contains the volume hologram, may be varied in different implementations of the invention, in accordance with the desired mechanical and optical properties of the layer and the overall device, for example.

At B a modified portion 318 that has been produced by a localised swelling technique similar to the previously described example is shown. It can be seen that the spacing of the fringes 333 has accordingly been increased in the modified portion 318 from the initial, unmodified spacing of the fringes 333 in the unmodified portions 317. As indicated by the arrows at B the holographic image layer 308 is illuminated with white light. In the unmodified portions 317 of the layer, the spacing of the fringes is $\Lambda_G$, which results in the component of the incident white light that has a wavelength $\lambda_G$, corresponding to an observable green colour, being preferentially diffracted so as to display the volume hologram in that green colour. In the present example, the $\Lambda_G$, order spacing corresponds to the original spacing of fringes produced when the volume hologram was recorded in the layer.

As a result of the localised swelling caused by the diffusion of the monomer into the centrally depicted portion 318 of the layer section at B, the spatial periodicity of the interference fringes is increased in that portion to $\Lambda_R$. For this reason, the volume hologram pattern in that portion 318 of the layer preferentially diffracts a longer-wavelength component of the incident white light out of the layer so as to display the volume hologram for that portion in a red colour, corresponding to the, $\lambda_R$, wavelength. As a result of this localised colour shift, the volume hologram, which was previously viewable uniformly across the entire layer in a green colour, exhibits a red dot at the modified portion 318, wherein the displayed colour has been shifted while retaining the holographic quality of the image in that portion.

The figure shows a sharp discontinuity in the spacing of the interference fringes 333 at the interfaces 331 between the unmodified portions 317 and the modified portion 318. This is in part a result of the schematic nature of the illustration. In practice, a transitional region between the modified 318 and unmodified 317 portions will typically exist, wherein there is a continuous change in the spacing Λ between the modified $\Lambda_R$ and unmodified $\Lambda_G$ spacings, this being a gradual variation across the plane of the layer 308 between the modified and unmodified states. It is generally preferred, however, that the extent of any such transitional zone be minimized, so that the apparent "edges" of any modified regions of the hologram are as sharp as possible, so as to render the elements of the pattern defined by the modified regions as distinct as possible. It is envisaged that these sharply defined regions may be achieved by, for example, applying heating and diffusible substance concentration conditions to the assembly that cause the rate of diffusion to be increased, and also by halting any diffusion, for example by fixing the hologram layer and the diffusion element using actinic radiation, after a shorter period of time.

At C a variation upon the device section shown at B is illustrated, wherein, instead of having been swollen by diffusion of a monomer into the holographic image layer from the diffusion element (not shown), the initial spacing $\Lambda_G$ of the fringes 333 has been reduced in the modified portion 318 to have smaller dimensions $\Lambda_B$. In the present case, this is achieved by providing the holographic image layer 308 such that it contains a higher concentration of a diffusible plasticizer than the diffusion element. It is in principle possible, however, for any diffusible substance to be selected for the purpose of diffusing out of localised parts 318 of the holographic image layer 308, via interruptions in the barrier layer (not shown) to be received by a diffusion element. As shown at C, the modified portion 318 exhibits the volume hologram in a modified, blue, colour, corresponding to the shortened wavelength $\lambda_B$.

Figure 4:
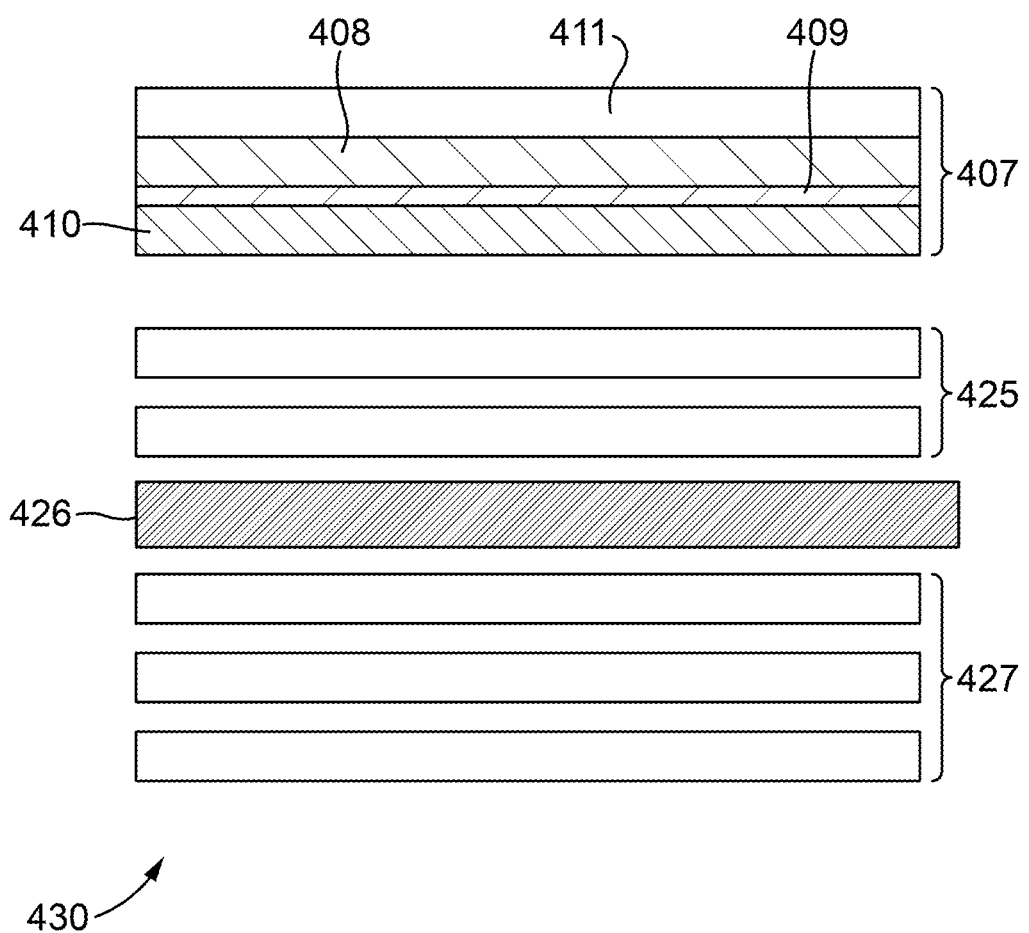
FIG. 4 is an exploded view showing schematically the layers of a security document according to the invention.

An example of a security document according to the present invention is shown in FIG. 4. The document is in the form of an ID card 430, the component layers of which are shown in a cross-section exploded view. In the present example, a multilayer assembly 407 similar to those described earlier in this disclosure is provided as the top layer and may be thought of as a holographic photopolymer system. Advantageously, the multilayer assembly 407 is provided as a component of the assembled ID card 430 prior to the holographic image layer 408 being personalised with localised colour shifts. In this way, the security document 430 can be manufactured to completion, notwithstanding the aforementioned patterning, at a centralised document production facility, and these cards may then be readily personalised at any facility having appropriate laser-marking equipment, owing to the presence in the document 430 of the self-contained holographic photopolymer system 407.

The multilayer assembly, as with the previously described examples, includes a protective PET layer 411 at a surface of the security device 407 that serves as an outer, top surface of both the security device 407 and the security document 430. To enable personalisation of the hologram layer 408 after assembly of the document 430 the top assembly 407 includes a barrier layer 409 and a diffusion layer 410. The document includes further layers, co-bonded together and underlying the top assembly 407. These layers, shown schematically in FIG. 4, are laser-engravable polycarbonate layers 425, an inlay and hinge layer 426, and non-laser engravable polycarbonate layers 427. The presence of the laser-engravable polycarbonate layers 425 in the document allows patterns and data to be marked onto the document by way of conventional, non-holographic laser-marking techniques.

Figure 5:
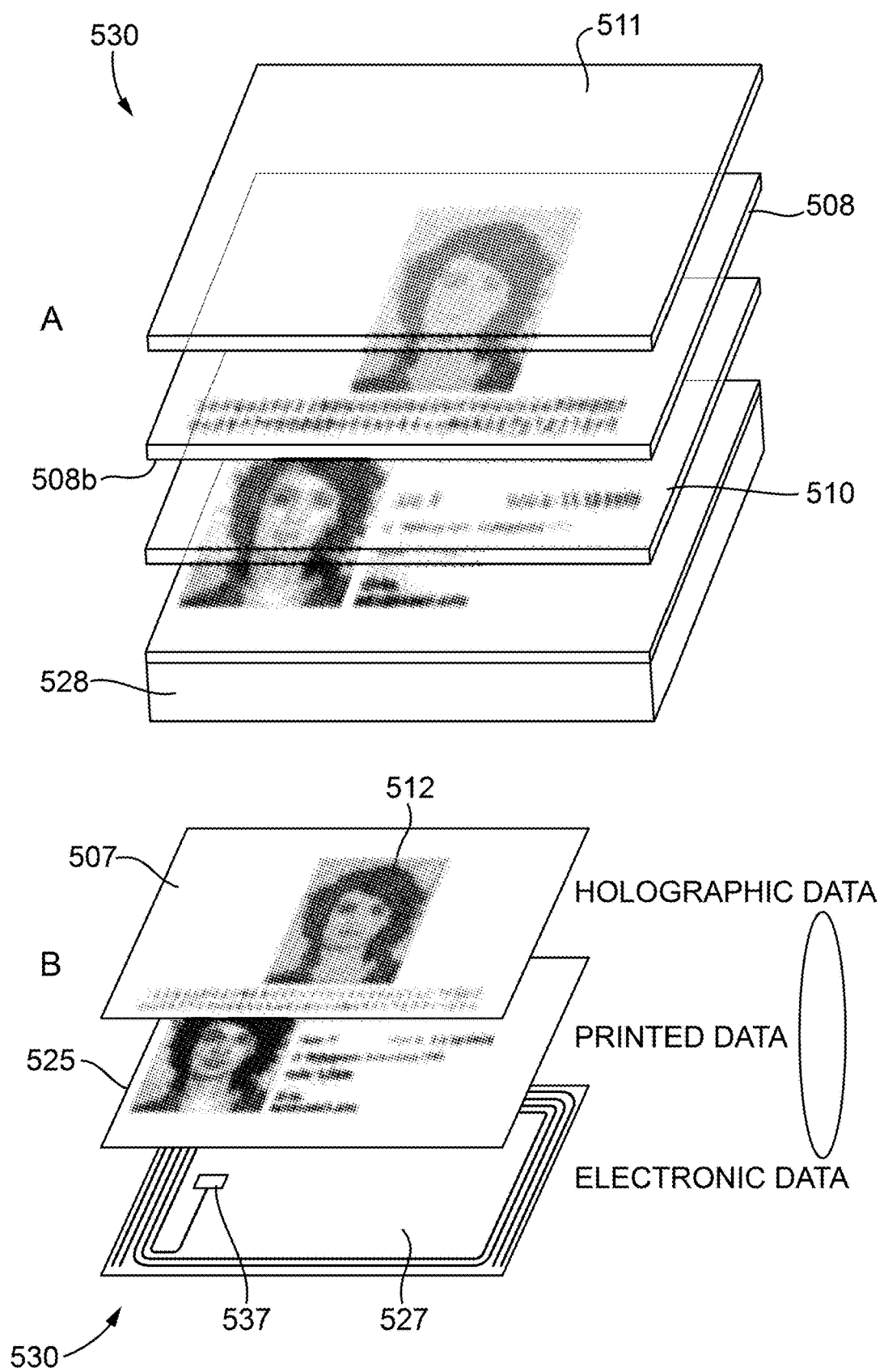
FIG. 5 shows two exploded perspective views depicting the layers of a further example security document according to the invention.

FIG. 5 shows the incorporation of a laser-personalised photopolymer hologram security device according to the invention included in ID cards or other documents. As shown in the exploded perspective view at A, the holographic image layer 508 is incorporated between additional layers of a multilayer document. Applied to the top surface, as depicted, of the holographic image layer 508 is a protective layer 511, which may be a PET layer or an anti-abrasion vanish. Applied to the bottom surface 508b of the holographic image layer 508 is a photo-modifiable barrier layer (not shown), which may be a wax coating applied in the form of a wax emulsion and including an infrared-opaque dye. A diffusion layer 510, the bottom surface of which a layer of adhesive is applied, is applied underneath the holographic image layer and barrier layer. It may be preferable to apply the adhesive, such as an UV curable adhesive, to the underlying polycarbonate layer of the card body 528 rather than to the diffusion layer 510. The diffusion layer 510 comprises a diffusible swelling monomer to be received by the holographic image layer 508 in a pattern-wise manner when the document 530 is personalised.

Adhered to the bottom surface of the diffusion layer 510 is the main body of the identity card 528. This is formed of one or more polycarbonate layers and may include a protective PET layer on the underside. Within the card body assembly 528, a computer chip, such as an NFC or RFID chip is integrated.

As shown at B, the assembled security document card 530 is capable of holding multiple forms of security information. Conventionally printed data, including photographic and image data, and alphanumeric data, is held by the polycarbonate layer 525. This is integrated into the card 530 together with the lower polycarbonate assembly 527 into which an NFC chip and antenna 537 are integrated. On top of those two layers 525, 527, holographic data, including a holographic image 512 is held by the holographic photopolymer system 507. The volume hologram 512 may be patterned so as to represent any desired data, such as personal data corresponding to the subject of the ID card for example, using the previously described methods.

Advantageously, therefore, the document 530 provides an improved degree of information redundancy by storing information in multiple formats as indicated at B. This includes the novel and visually striking effect of information or a pattern being visible within the hologram 512 itself.

The invention claimed is:

1. A method of forming a security device, the method comprising:
   providing a multilayer assembly comprising:
      a holographic image layer having a region comprising a volume hologram that is viewable in a first observable colour, the region being formed from a material comprising a diffusible substance at a first concentration;
      a diffusion element having a region that overlaps the said region of the holographic image layer and is formed from a material comprising the diffusible substance at a second concentration, different from the first concentration; and
      a barrier layer having a region that is impassable to the diffusible substance and is interposed between the said region of the holographic image layer and the said region of the diffusion element so as to preclude diffusion of the diffusible material therebetween, the said region of the barrier layer comprising a heat-transformable material, and
   selectively applying heat at a plurality of positions within the said region of the barrier layer, in accordance with a predetermined pattern, so as to modify the heat-transformable material such that the region of the barrier layer is selectively rendered passable to the diffusible substance at each of the plurality of positions, thereby permitting diffusion of the diffusible substance between the said regions of the diffusion element and the holographic image layer such that, at a plurality of positions within the said region of the holographic image layer and corresponding to the predetermined pattern, the volume hologram is dimensionally modified so as to become viewable in a second observable colour, different from the first observable colour.

2. The method according to claim 1, wherein the barrier layer comprises a radiation-absorbing material, and wherein the said selectively applying heat comprises exposing the barrier layer, at the said plurality of positions within the said region thereof, to radiation.

3. The method according to claim 2, wherein the said radiation-absorbing material is opaque at least to radiation having a wavelength within a range in the infrared region of the electromagnetic spectrum.

4. The method according to claim 2, wherein the said exposing the barrier layer to radiation comprises causing a laser beam to impinge upon the barrier layer at the said plurality of positions within the said region thereof.

5. The method according to claim 1, wherein providing the multilayer assembly comprises:

providing the holographic image layer, the said region of which comprises the volume hologram;

applying a layer of an emulsion over at least a portion of the said region of the holographic image layer, the emulsion comprising a fluid containing a dispersion of particles that comprise the said heat-transformable material; and removing at least a portion of the fluid from the applied emulsion such that the said particles remain so as to form the said region of the barrier layer.

6. The method according to claim 1:
wherein either of the first concentration and the second concentration is substantially zero, or
wherein each of the first concentration and the second concentration is substantially greater than zero.

7. The method according to claim 1:
wherein the second concentration is higher than the first concentration, such that the said permitted diffusion comprises a net diffusion of the diffusible substance from the said region of the diffusion element to the said region of the holographic image layer, or
wherein the first concentration is higher than the second concentration, such that the said permitted diffusion comprises a net diffusion of the diffusible substance from the said region of the holographic image layer to the said region of the diffusion element.

8. The method according to claim 1, wherein the said dimensionally modifying the volume hologram comprises modifying the dimensions of part of an interference pattern comprised by the volume hologram.

9. The method according to claim 1, comprising permitting diffusion of an amount of the diffusible substance between the said regions of the diffusion element and the holographic image layer that is sufficient to modify the wavelength of light in which the volume hologram is viewable, wherein the amount of the diffusible substance that is permitted to diffuse between the said regions of the diffusion element and the holographic image layer is sufficient to modify the said wavelength so as to produce a predetermined colour change.

10. The method according to claim 9, comprising controlling the amount of the diffusible substance that is permitted to diffuse between the said regions of the diffusion element and the holographic image layer by way of controlling any one or more of: a rate at which diffusion occurs; an amount of time for which the said diffusion is permitted; and the second concentration, at which the diffusible material is comprised in the region of the diffusion element in the multilayer assembly as provided.

11. The method according to claim 1, wherein the said dimensional modification of the volume hologram is confined to one or more modified portions of the region of the holographic image layer, the said portions being arranged to correspond to the predetermined pattern, and wherein at least one unmodified portion of the region of the holographic image layer remains viewable in the first observable colour.

12. The method according to claim 1, wherein the dimensional modification of the volume hologram is irreversible.

13. The method according to claim 1, wherein the diffusible substance comprises a monomer, and wherein the said material from which the said region of the holographic image layer is formed comprises a polymer material comprising the monomer, and wherein the diffusible substance comprises a plasticizer and/or a solvent.

14. A security device made in accordance with the method of claim 1.

15. A security article comprising the security device according to claim 14, wherein the security article is a polymer substrate selected from the group consisting of an identity card, a passport datapage, or a security thread, strip, patch, label, or transfer foil.

16. The security document comprising the security article according to claim 15, wherein the security device or security article is affixed to a surface of the document, or is located in a transparent window region of the document, or is inserted as a window thread.

17. A security device comprising:
a holographic image layer having a region comprising a volume hologram of which at least one unmodified portion is viewable in a first observable colour,
wherein at a plurality of positions within the said region of the holographic image layer and defining a pattern, the volume hologram is dimensionally modified so as to be viewable in a second observable colour, different from the first observable colour,
wherein the said region of holographic image layer is formed from a material which, at the said plurality of positions within the region, comprises a diffusible substance at a first concentration, and which, in the said at least one unmodified portion, comprises the diffusible substance at a second concentration, different from the first concentration,
the device comprising a multilayer assembly, the said assembly comprising: the holographic image layer; and
a barrier layer having a region that is impassable to the diffusible substance.

18. The security device according to claim 17, wherein the multilayer assembly further comprises a diffusion element having a region that overlaps the said region of the holographic image layer,
and wherein the said region of the barrier layer is interposed between the said region of the holographic image layer and the said region of the diffusion element so as to preclude diffusion of the diffusible material therebetween.

19. The security article comprising the security device according to claim 17, wherein the security article is a polymer substrate selected from the group consisting of an identity card, a passport datapage, or a security thread, strip, patch, label, or transfer foil.

20. A security document comprising the security article according to claim 19, wherein the security device or security article is affixed to a surface of the document located in a transparent window region of the document, or is inserted as a window thread.

* * * * *